(12) United States Patent
Yang et al.

(10) Patent No.: US 11,736,013 B2
(45) Date of Patent: Aug. 22, 2023

(54) BUCK-BOOST SWITCHING REGULATOR HAVING BYPASS MODE AND CONTROL METHOD THEREOF

(71) Applicant: Richtek Technology Corporation, Zhubei (TW)

(72) Inventors: Shei-Chie Yang, Taichung (TW); Jian-Yu Tu, New Taipei (TW); Yuan-Yen Mai, Taipei (TW); Pao-Hsun Yu, Hsinchu (TW)

(73) Assignee: Richtek Technology Corporation, Zhubei (TW)

( * ) Notice: Subject to any disclaimer, the term of this patent is extended or adjusted under 35 U.S.C. 154(b) by 0 days.

(21) Appl. No.: 17/566,678

(22) Filed: Dec. 30, 2021

(65) Prior Publication Data

US 2022/0224233 A1    Jul. 14, 2022

Related U.S. Application Data

(60) Provisional application No. 63/136,915, filed on Jan. 13, 2021.

(30) Foreign Application Priority Data

Aug. 19, 2021  (TW) .................... 110130737

(51) Int. Cl.
*H02M 3/158* (2006.01)
*H02M 1/00* (2006.01)

(52) U.S. Cl.
CPC ........ *H02M 3/1582* (2013.01); *H02M 1/009* (2021.05)

(58) Field of Classification Search
CPC ... H02M 3/1582; H02M 1/0045; H02M 1/009
See application file for complete search history.

(56) References Cited

U.S. PATENT DOCUMENTS

| | | | |
|---|---|---|---|
| 2006/0006850 A1* | 1/2006 | Inoue | H02J 7/007182 323/265 |
| 2013/0076648 A1* | 3/2013 | Krah | G06F 3/04164 345/173 |
| 2014/0176094 A1* | 6/2014 | Yang | H02M 3/1582 323/266 |
| 2014/0225577 A1* | 8/2014 | Ivanov | H02M 3/1582 323/225 |

\* cited by examiner

*Primary Examiner* — Peter M Novak
(74) *Attorney, Agent, or Firm* — Tung & Associates

(57) ABSTRACT

A buck-boost switching regulator includes: a power switch circuit including an input switch unit and an output switch unit which switch a first terminal and a second terminal of an inductor for buck-boost conversion; at least one low dropout regulator correspondingly coupled to at least one output high side switch in the output switch unit to correspondingly convert at least one low dropout voltage into at least one output voltage; and a bypass control circuit configured to operably generate a bypass control signal according to a conversion voltage difference between the input voltage and the corresponding low dropout voltage; wherein when the corresponding conversion voltage difference is lower than a reference voltage, the bypass control signal controls a corresponding bypass switch to electrically connect the input voltage with the corresponding low dropout node.

22 Claims, 16 Drawing Sheets

| VTC[k] | VthU[k] | VthL[k] |
|---|---|---|
| VINLDO[k]_S − VIN_S | Vref1 | Vref2 |
| VINLDO[k]_S | VIN_S + Vref1 | VIN_S − Vref2 |
| VIN_S | VINLDO[k]_S + Vref2 | VINLDO[k]_S − Vref1 |

Fig. 3B

BUCK-BOOST SWITCHING REGULATOR HAVING BYPASS MODE AND CONTROL METHOD THEREOF

CROSS REFERENCE

The present invention claims priority to U.S. 63/136,915 filed on Jan. 13, 2021 and claims priority to TW 110130737 filed on Aug. 19, 2021.

BACKGROUND OF THE INVENTION

Field of Invention

The present invention relates to a buck-boost switching regulator, and particularly to a buck-boost switching regulator having bypass mode. The present invention also relates to a method for controlling a buck-boost switching regulator.

Description of Related Art

Please refer to FIG. 1, which illustrates a conventional single input multiple output buck-boost switching regulator. Low dropout voltages VINLDO[1], VINLDO[2] and VINLDO[3] of this conventional single input multiple output buck-boost switching regulator are respectively and correspondingly converted into output voltages VOUT[1], VOUT[2] and VOUT[3] by corresponding low dropout regulators. This conventional single input multiple output buck-boost switching regulator has a drawback that: when the input voltage VIN is close to the low dropout voltages VINLDO[1], VINLDO[2] and VINLDO[3], the switching loss of the single input multiple output buck-boost switching regulator is high, and the overall power conversion efficiency is low.

In view of the above, to overcome the drawback in the prior art, the present invention proposes a buck-boost switching regulator, wherein when the input voltage is close to the low dropout voltages, the buck-boost switching regulator of the present invention can reduce the switching loss by a bypass mode, so as to enhance the efficiency.

SUMMARY OF THE INVENTION

In one aspect, the present invention provides a buck-boost switching regulator for converting an input voltage into at least one output voltage. The buck-boost switching regulator includes: a power switch circuit including an input switch unit and an output switch unit, wherein the input switch unit is configured to operably switch a first terminal of an inductor between the input voltage and a ground level, and the output switch unit is configured to operably switch a second terminal of the inductor between at least one low dropout node and the ground level, so as to convert the input voltage at the at least one low dropout node into at least one corresponding low dropout voltage. The at least one low dropout node is correspondingly coupled to at least one output high side switch of the output switch unit. The buck-boost switching regulator further includes at least one low dropout regulator correspondingly coupled to the at least one output high side switch to correspondingly convert the at least one low dropout voltage into the at least one output voltage; a bypass control circuit configured to operably generate a bypass control signal according to a conversion voltage difference between the input voltage and the corresponding low dropout voltage; and a bypass switching circuit. When the corresponding conversion voltage difference is lower than a reference voltage, the bypass control signal controls the bypass switching circuit to electrically connect the input voltage with the corresponding low dropout node, such that the buck-boost switching regulator operates in a bypass mode.

In one embodiment, the bypass switching circuit includes the corresponding output high side switch and an input high side switch of the input switch unit. The bypass control circuit generates the corresponding bypass control signal to control the corresponding output high side switch and the input high side switch to be both turned on when the corresponding conversion voltage difference is lower than the reference voltage, so as to electrically connect the input voltage with the corresponding low dropout node via the inductor.

In one embodiment, the bypass switching circuit includes at least one bypass switch which is directly electrically connected between the input voltage and the corresponding low dropout node, and this bypass switch is controlled to be turned on when the corresponding conversion voltage difference is lower than the reference voltage, so as to electrically connect the input voltage with the corresponding low dropout node directly.

In one embodiment, the conversion voltage difference is an absolute value of a difference between the input voltage and the corresponding low dropout voltage.

In one embodiment, the reference voltage includes a first reference voltage and a second reference voltage. The corresponding bypass control signal is enabled when a difference of the corresponding low dropout voltage minus the input voltage is lower than the first reference voltage and a difference of the input voltage minus the corresponding low dropout voltage is lower than the second reference voltage. The first reference voltage and the second reference voltage have one of the following relationships: (1) the first reference voltage is equal to the second reference voltage, and both the first reference voltage and the second reference voltage are not zero; (2) the first reference voltage is equal to zero, and the second reference voltage is not zero; (3) the second reference voltage is equal to zero, and the first reference voltage is not zero; or (4) the first reference voltage is not equal to the second reference voltage, and both the first reference voltage and the second reference voltage are not zero.

In one embodiment, the bypass control circuit includes: a threshold control circuit configured to operably generate an upper threshold and a lower threshold according to the reference voltage; and a comparison circuit configured to operably compare a subject signal with the upper threshold and the lower threshold. The corresponding bypass control signal is enabled when the subject signal is between the upper threshold and the lower threshold, so as to electrically connect the input voltage with the corresponding low dropout node. The subject signal, the upper threshold and the lower threshold have one of the following relationships: (1) the subject signal is the corresponding conversion voltage difference, the upper threshold is the first reference voltage and the lower threshold is the second reference voltage; (2) the subject signal is the corresponding low dropout voltage, the upper threshold is a sum of the input voltage and the first reference voltage, and the lower threshold is a difference between the input voltage and the second reference voltage; or (3) the subject signal is the input voltage, the upper threshold is a sum of the corresponding low dropout voltage and the second reference voltage, and the lower threshold is a difference between the corresponding low dropout voltage and the first reference voltage.

In one embodiment, the input switch unit includes: an input high side switch coupled between the input voltage and the first terminal of the inductor; and an input low side switch or an input low side diode coupled between the ground level and the first terminal of the inductor; wherein the input high side switch and the input low side switch or the input low side diode are configured to operably switch the first terminal of the inductor between the input voltage and the ground level.

In one embodiment, the output switch unit includes: an output low side switch coupled between the ground level and the second terminal of the inductor; and the at least one output high side switch, respectively and correspondingly coupled between the at least one low dropout node and the second terminal of the inductor. The output low side switch and the at least one output high side switch are configured to operably switch the second terminal of the inductor between the at least one low dropout node and the ground level, so as to generate the at least one corresponding low dropout voltage at the at least one low dropout node.

In one embodiment, the buck-boost switching regulator is further operable in a buck mode and in a boost mode respectively according to the input voltage and the corresponding low dropout voltage when the corresponding conversion voltage difference is not lower than the reference voltage.

In one embodiment, the buck-boost switching regulator operates in the boost mode when a difference of the corresponding low dropout voltage minus the input voltage is not lower than the first reference voltage, and the buck-boost switching regulator operates in the buck mode when a difference of the input voltage minus the corresponding low dropout voltage is not lower than the second reference voltage.

In one embodiment, the buck-boost switching regulator is further operable in a buck-boost mode according to the input voltage and the corresponding low dropout voltage when the corresponding conversion voltage difference is not lower than the reference voltage.

In one embodiment, the buck-boost switching regulator operates in a corresponding mode according to one of the following listed orders when the conversion voltage difference changes from higher to lower: (1) the boost mode, the buck-boost mode, the bypass mode, and the buck mode; (2) the boost mode, the bypass mode, the buck-boost mode, and the buck mode; or (3) the boost mode, the buck-boost mode, the bypass mode, the buck-boost mode, and the buck mode.

In one embodiment, the at least one low dropout regulator is a negative voltage generator circuit, wherein the negative voltage generator circuit includes: a negative charge pump coupled to the corresponding low dropout node, wherein the negative charge pump is configured to operably convert the corresponding low dropout voltage into a negative low dropout voltage; and at least one negative low dropout regulator coupled to the negative charge pump, wherein the at least one negative low dropout regulator is configured to operably convert the negative low dropout voltage into at least one corresponding negative output voltage.

In another aspect, the present invention provides a method for controlling a buck-boost switching regulator to convert an input voltage into at least one output voltage, the buck-boost switching regulator including a power switch circuit, the power switch circuit including an input switch unit and an output switch unit, wherein the input switch unit is configured to operably switch a first terminal of an inductor between the input voltage and a ground level, and the output switch unit is configured to operably switch a second terminal of the inductor between at least one low dropout node and the ground level, so as to convert the input voltage at the at least one low dropout node into at least one corresponding low dropout voltage, and the at least one low dropout node is correspondingly coupled to at least one output high side switch of the output switch unit; the method comprising: converting the at least one low dropout voltage into the at least one output voltage by at least one low dropout regulator in correspondence; generating a bypass control signal according to a conversion voltage difference between the input voltage and the corresponding low dropout voltage; and when the corresponding conversion voltage difference is lower than a reference voltage, the bypass control signal controlling the input voltage to be electrically connected with the corresponding low dropout node, such that the buck-boost switching regulator operates in a bypass mode.

In one embodiment, the bypass control signal controls the corresponding output high side switch and the input high side switch to be both turned on when the corresponding conversion voltage difference is lower than the reference voltage, so as to electrically connect the input voltage with the corresponding low dropout node via the inductor.

In one embodiment, a corresponding bypass switch of at least one bypass switch is controlled to be turned on when the corresponding conversion voltage difference is lower than the reference voltage, so as to electrically connect the input voltage with the corresponding low dropout node directly, wherein the at least one bypass switch is directly electrically connected between the input voltage and the corresponding low dropout node.

In one embodiment, the conversion voltage difference is an absolute value of a difference between the input voltage and the corresponding low dropout voltage.

In one embodiment, the reference voltage includes a first reference voltage and a second reference voltage, wherein the corresponding bypass control signal is enabled when a difference of the low dropout voltage minus the input voltage is lower than the first reference voltage and a difference e of the input voltage minus the low dropout voltage is lower than the second reference voltage, wherein the first reference voltage and the second reference voltage have one of the following relationships: (1) the first reference voltage is equal to the second reference voltage, and both the first reference voltage and the second reference voltage are not zero; (2) the first reference voltage is equal to zero, and the second reference voltage is not zero; (3) the second reference voltage is equal to zero, and the first reference voltage is not zero; or (4) the first reference voltage is not equal to the second reference voltage, and both the first reference voltage and the second reference voltage are not zero.

In one embodiment, the step of generating the bypass control circuit includes: generating an upper threshold and a lower threshold according to the reference voltage; and comparing a subject signal with the upper threshold and the lower threshold, wherein the corresponding bypass control signal is enabled when the subject signal is between the upper threshold and the lower threshold, so as to electrically connect the input voltage with the corresponding low dropout node, wherein the subject signal, the upper threshold and the lower threshold have one of the following relationships: (1) the subject signal is the corresponding conversion voltage difference, the upper threshold is the first reference voltage and the lower threshold is the second reference voltage; (2) the subject signal is the corresponding low dropout voltage, the upper threshold is a sum of the input voltage and the first reference voltage, and the lower threshold is a difference between the input voltage and the second reference voltage; or (3) the subject signal is the input voltage, the upper threshold is a sum of the corresponding low dropout voltage and the second reference voltage, and the lower threshold is a difference between the corresponding low dropout voltage and the first reference voltage.

In one embodiment, the buck-boost switching regulator is further operable in a buck mode and in a boost mode respectively according to the input voltage and the corresponding low dropout voltage when the corresponding conversion voltage difference is not lower than the reference voltage.

In one embodiment, the buck-boost switching regulator is controlled to operate in the boost mode when a difference of the corresponding low dropout voltage minus the input voltage is not lower than the first reference voltage, and the buck-boost switching regulator is controlled to operate in the buck mode when a difference of the input voltage minus the corresponding low dropout voltage is not lower than the second reference voltage.

In one embodiment, the buck-boost switching regulator is further operable in a buck-boost mode according to the input voltage and the corresponding low dropout voltage when the corresponding conversion voltage difference is not lower than the reference voltage.

In one embodiment, the buck-boost switching regulator operates in a corresponding mode according to one of the following listed orders when the conversion voltage difference changes from higher to lower: (1) the boost mode, the buck-boost mode, the bypass mode, and the buck mode; (2) the boost mode, the bypass mode, the buck-boost mode, and the buck mode; or (3) the boost mode, the buck-boost mode, the bypass mode, the buck-boost mode, and the buck mode.

In one embodiment, the at least one output voltage includes at least one negative output voltage, and the method further includes: converting the corresponding low dropout voltage into a negative low dropout voltage; and converting the negative low dropout voltage into the at least one corresponding negative output voltage.

One advantage of the present invention is that the present invention has smaller switching loss and higher efficiency when the input voltage is close to the low dropout voltage.

Another advantage of the present invention is that the present invention provides more LDO headroom because the input voltage is directly bypassed to the input terminal of the low dropout regulator.

Still another advantage of the present invention is that the present invention can save the layout area of the bypass switch.

The objectives, technical details, features, and effects of the present invention will be better understood with regard to the detailed description of the embodiments below, with reference to the attached drawings.

BRIEF DESCRIPTION OF THE DRAWINGS

FIG. 3B illustrates a comparison table of signals in a bypass control circuit of the buck-boost switching regulator in accordance with one embodiment of the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
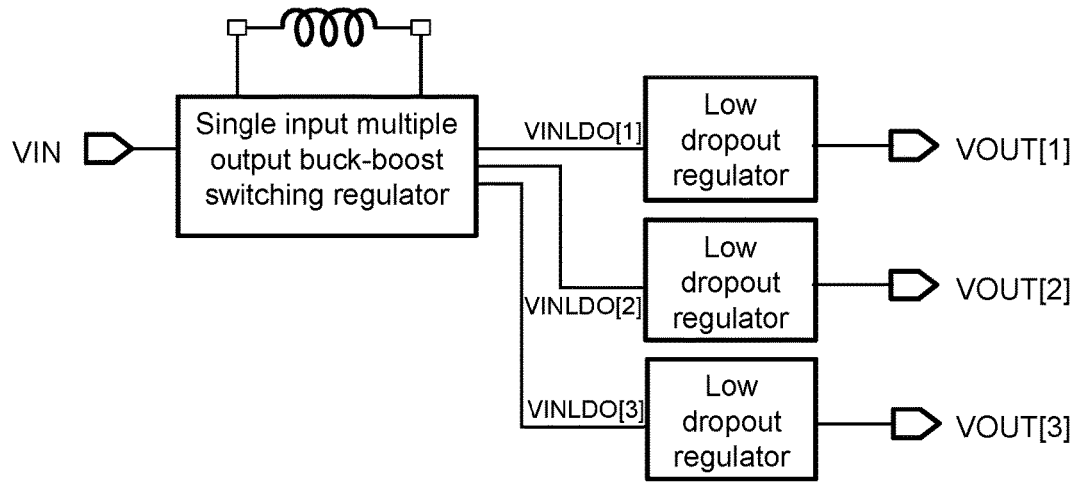
FIG. 1 illustrates a schematic diagram of a conventional single input multiple output buck-boost switching regulator.
Figure 2:
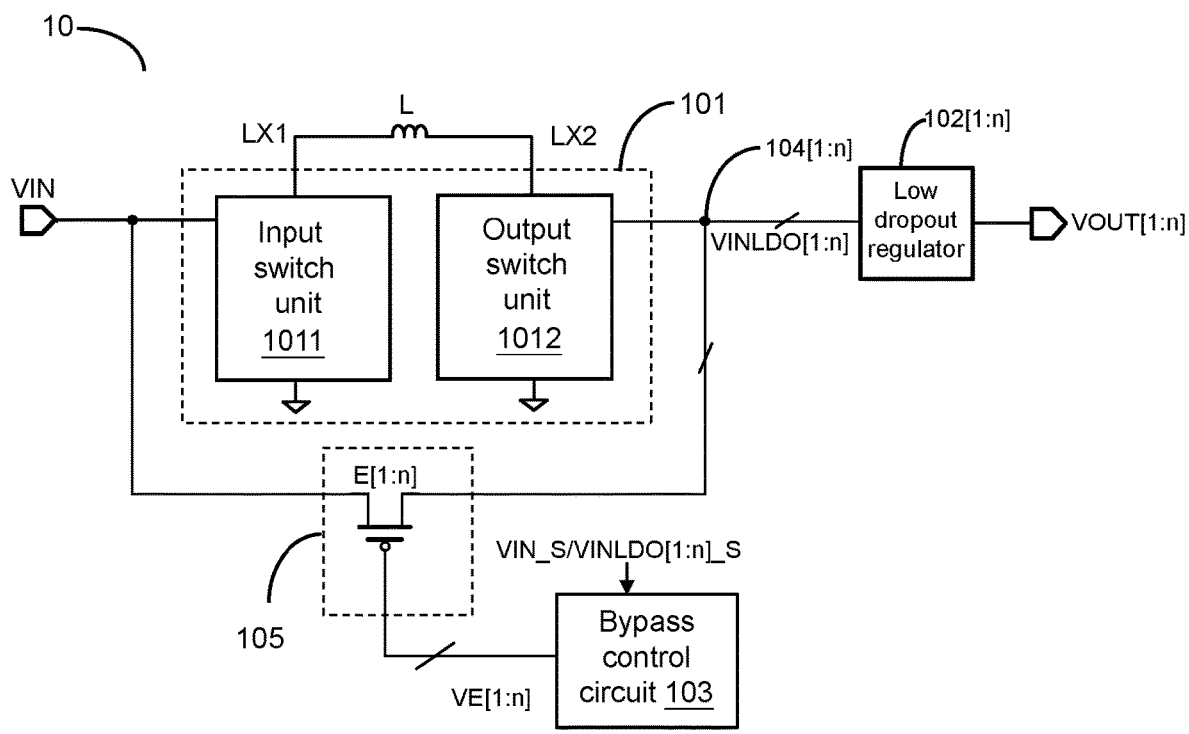
FIG. 2 illustrates a schematic circuit diagram of a buck-boost switching regulator in accordance with one embodiment of the present invention.

FIG. 2 illustrates a schematic circuit diagram of a buck-boost switching regulator in accordance with one embodiment of the present invention. The buck-boost switching regulator 10 of the present invention includes a power switch circuit 101, low dropout regulator(s) 102[1:n], a bypass switching circuit 105 and a bypass control circuit 103, wherein n is a positive integer which is larger than or equal to 1.

The power switch circuit 101 includes an input switch unit 1011 and an output switch unit 1012. The input switch unit 1011 is configured to switch a first terminal of an inductor L (for example LX1 shown in FIG. 2) between an input voltage VIN and a ground level while the output switch unit 1012 is configured to switch a second terminal of the inductor L (such as LX2 shown in FIG. 2) between low dropout node(s) 104[1:n] and a ground level. The low dropout node(s) 104[1:n] have corresponding low dropout voltage(s) VINLDO[1:n] respectively. In one aspect, the power switch circuit 101 and the inductor L collectively form the buck-boost switching regulator to convert the input voltage VIN into the low dropout voltage(s) VINLDO[1:n], wherein the input voltage VIN may be larger than, equal to or less than the low dropout voltage(s) VINLDO[1:n].

Still referring to FIG. 2, at least one low dropout regulator 102[1:n] is coupled to the output switch unit 1012 to respectively and correspondingly convert the low dropout voltage(s) VINLDO[1:n] into the output voltage(s) VOUT [1:n]. The bypass control circuit 103 is configured to generate bypass control signal(s) VE[1:n] according to a conversion voltage difference(s) between the input voltage VIN and corresponding low dropout voltage(s) VINLDO[1:n], wherein the conversion voltage difference is a difference between the input voltage VIN and a corresponding low dropout voltage VINLDO[1:n]. The bypass control signal VE[1:n] controls the bypass switching circuit 105 to electrically connect the input voltage VIN with the corresponding low dropout node 104[1:n] when the corresponding conversion voltage difference is lower than a reference voltage, such that the buck-boost switching regulator operates in a bypass mode.

Figure 4:
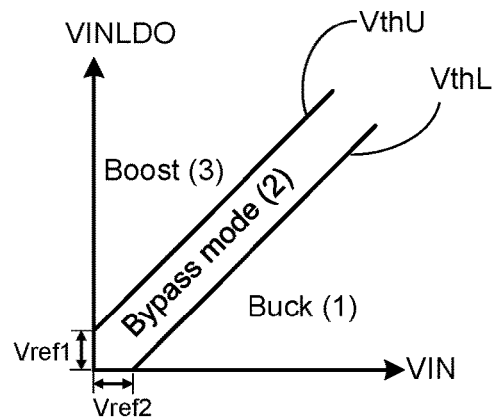
FIG. 4 illustrates a characteristic diagram of operation modes of the buck-boost switching regulator in accordance with one embodiment of the present invention.

Please refer to FIG. 4. FIG. 4 illustrates a characteristic diagram of operation modes of the buck-boost switching regulator in accordance with one embodiment of the present invention. In one embodiment, the buck-boost switching regulator of the present invention can operate in the bypass mode when the conversion voltage difference is lower than the reference voltage.

Taking FIG. 4 as an example, in one embodiment, the reference voltage includes a first reference voltage Vref1 and a second reference voltage Vref2. In the present embodiment, the buck-boost switching regulator operates in the bypass mode when (VINLDO−VIN)<Vref1 and (VIN−VINLDO)<Vref2.

Please refer to FIG. 2. In one embodiment, as shown in FIG. 2, the bypass switching circuit 105 includes bypass switch(es) E[1:n]. The bypass control signal VE[1:n] controls a corresponding bypass switch E[1:n] to electrically connect the input voltage VIN with the corresponding low dropout node 104[1:n] when the corresponding conversion voltage difference is lower than the reference voltage. In the embodiment shown in FIG. 2, the bypass switch(es) E[1:n] are respectively directly electrically connected between the input voltage VIN and the corresponding low dropout node(s) 104[1:n], so that when the corresponding conversion voltage difference is lower than the reference voltage, the corresponding bypass switch E[1:n] electrically directly connects the input voltage VIN and the corresponding low dropout node(s) 104[1:n]. In one embodiment, the conversion voltage difference is an absolute value of a difference between the input voltage VIN and the corresponding low dropout voltage VINLDO[1:n].

Figure 3A:
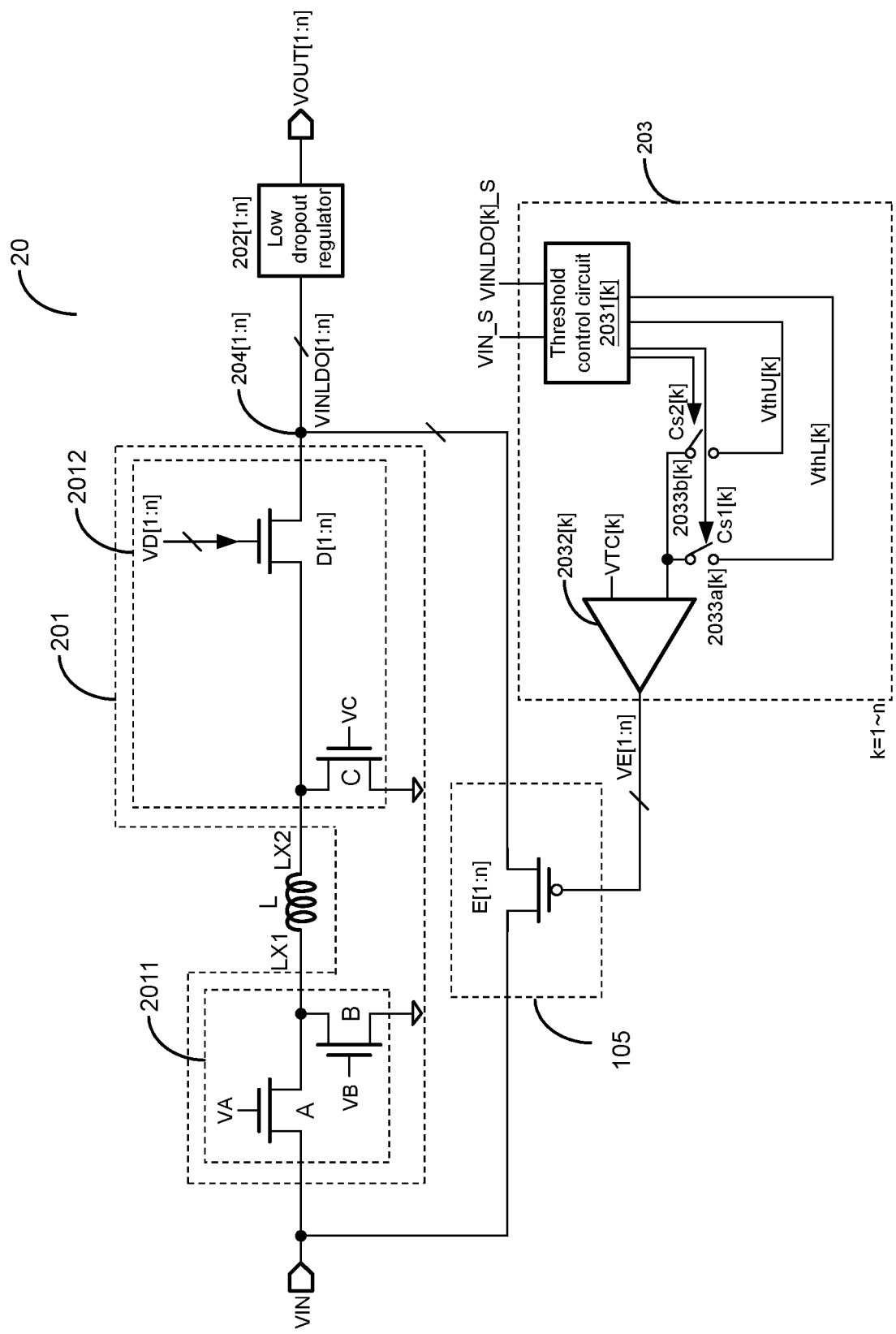
FIG. 3A illustrates a schematic circuit diagram of a buck-boost switching regulator in accordance with another embodiment of the present invention.

FIG. 3A illustrates a schematic circuit diagram of a single input at least one output buck-boost switching regulator in accordance with another embodiment of the present invention. An inductor L, a power switch circuit 201, low dropout regulator(s) 202[1:n] and bypass switch(es) E[1:n] are similar to the inductor L, the power switch circuit 101, low dropout regulator(s) 102[1:n] and bypass switch(es) E[1:n] in the previous embodiment; therefore, detailed descriptions thereof are omitted. As shown in FIG. 3A, the input switch unit 2011 includes an input high side switch A and an input low side switch B (or instead, the input low side switch B may be replaced by an input low side diode in another embodiment). The input high side switch A is coupled between the input voltage VIN and a first terminal LX1 of the inductor L, while the input low side switch B is coupled between a ground level and the first terminal LX1 of the inductor L. The control signals VA and VB are configured to control the input high side switch A (if the input low side switch B is replaced by an input low side diode) or control the input high side switch A and the input low side switch B (in this embodiment), so as to switch the first terminal LX1 of the inductor L between the input voltage VIN and the ground level. The output switch unit 2012 includes an output low side switch C and at least one output high side switch D[1:n]. The output low side switch C is coupled between the ground level and a second terminal LX2 of the inductor L, while the output high side switch(es) D[1:n] is coupled between the corresponding low dropout voltage(s) VINLDO [1:n] and the second terminal LX2 of the inductor L respectively. The control signals VC and VD[1:n] are configured to control the output low side switch C and the output high side switch(es) D[1:n] to switch the second terminal LX2 of the inductor L between the corresponding low dropout voltage(s) VINLDO[1:n] and the ground level, such that the input voltage VIN is converted into the corresponding low dropout voltage(s) VINLDO[1:n]. The low dropout node(s) 204[1:n] is/are correspondingly coupled to the output high side switch(es) D[1:n] of the output switch unit 2012, wherein n is an integer which is larger than or equal to 1.

As shown in FIG. 3A, the bypass control circuit 203 includes a threshold control circuit 2031[k] and a comparison circuit 2032[k], wherein k is a serial number which is any of 1~n. The threshold control circuit 2031[k] is configured to generate an upper threshold VthU[k], a lower threshold VthL[k] and plural control signals Cs1[k] and Cs2[k] according to the reference voltage. The plural control signals Cs1[k] and Cs2[k] are configured to control switches 2033a[k] and 2033b[k] respectively, so as to output the lower threshold VthL[k] and the upper threshold VthU[k] to the comparison circuit 2032[k] respectively. The comparison circuit 2032[k] is configured to compare a subject signal VTC[k] with the upper threshold VthU[k] and the lower threshold VthL[k]. When the subject signal VTC[k] is between the upper threshold VthU[k] and the lower threshold VthL[k], the bypass control signal VE[k] is enabled to turn on the bypass switch E[k] so as to electrically connect the input voltage VIN with the corresponding low dropout node 204[k], and the buck-boost switching regulator 10 of the present invention enters the bypass mode. It should be noted that in the embodiment shown in FIG. 3A and in the embodiment in which n is larger than 1, there can be just a portion of the channels among n channels to enter the bypass mode, while the other channels remain in the normal operation mode, for example a boost mode or a buck mode. Furthermore, it should be noted that the bypass control circuit 203 of the buck-boost switching regulator 20 is not limited to the structure shown in FIG. 3A and can employ any other applicable structure. The structure shown in FIG. 3A is an example for illustrating the present invention, but not for limiting the broadest scope of the present invention.

FIG. 3B illustrates a comparison table of signals in a bypass control circuit of the buck-boost switching regulator in accordance with one embodiment of the present invention. FIG. 3B lists an embodiment of examples of the subject signals VTC[k], the upper threshold VthU[k] and the lower threshold VthL[k]. In one embodiment, the subject signal VTC[k], the upper threshold VthU[k] and the lower threshold VthL[k] have one of the following relationships: (1) the subject signal VTC[k] is the conversion voltage difference VINLDO[k]−VIN, the upper threshold VthU[k] is the first reference voltage Vref1 and the lower threshold VthL[k] is the second reference voltage Vref2; (2) the subject signal VTC[k] is the low dropout voltage VINLDO[k], the upper threshold VthU[k] is the sum of the input voltage VIN and the first reference voltage Vref1, and the lower threshold VthL[k] is the difference between the input voltage VIN and the second reference voltage Vref2; (3) the subject signal VTC[k] is the input voltage VIN, the upper threshold VthU[k] is the sum of the low dropout voltage VINLDO[k] and the second reference voltage Vref2, and the lower threshold VthL[k] is the difference between the low dropout voltage VINLDO[k] and the first reference voltage Vref1.

More specifically in one embodiment, when the subject signal VTC[k] is the input voltage sensing signal VIN_S, the upper threshold VthU[k] is the value of the low dropout voltage sensing signal VINLDO[k]_S plus the second reference voltage Vref2, and the lower threshold VthL[k] is the value of the low dropout voltage sensing signal VINLDO[k]_S minus the first reference voltage Vref1. In another embodiment, when the subject signal VTC[k] is the low dropout voltage sensing signal VINLDO_S, the upper threshold VthU[k] is the value of the input voltage sensing signal VIN_S plus the first reference voltage Vref1, and the lower threshold VthL[k] is the value of the input voltage sensing signal VIN_S minus the second reference voltage Vref2. In still another embodiment, when the subject signal VTC[k] is the value of the low dropout voltage sensing signal VINLDO[k]_S minus the input voltage sensing signal VIN_S, the upper threshold VthU[k] is the first reference voltage Vref1, and the lower threshold VthL[k] is the second reference voltage Vref2. The input voltage sensing signal VIN_S is a sensing signal which corresponds to the input voltage VIN while the low dropout voltage sensing signal VINLDO[k]_S is a sensing signal which corresponds to the low dropout voltage VINLDO[k].

Figure 3C:
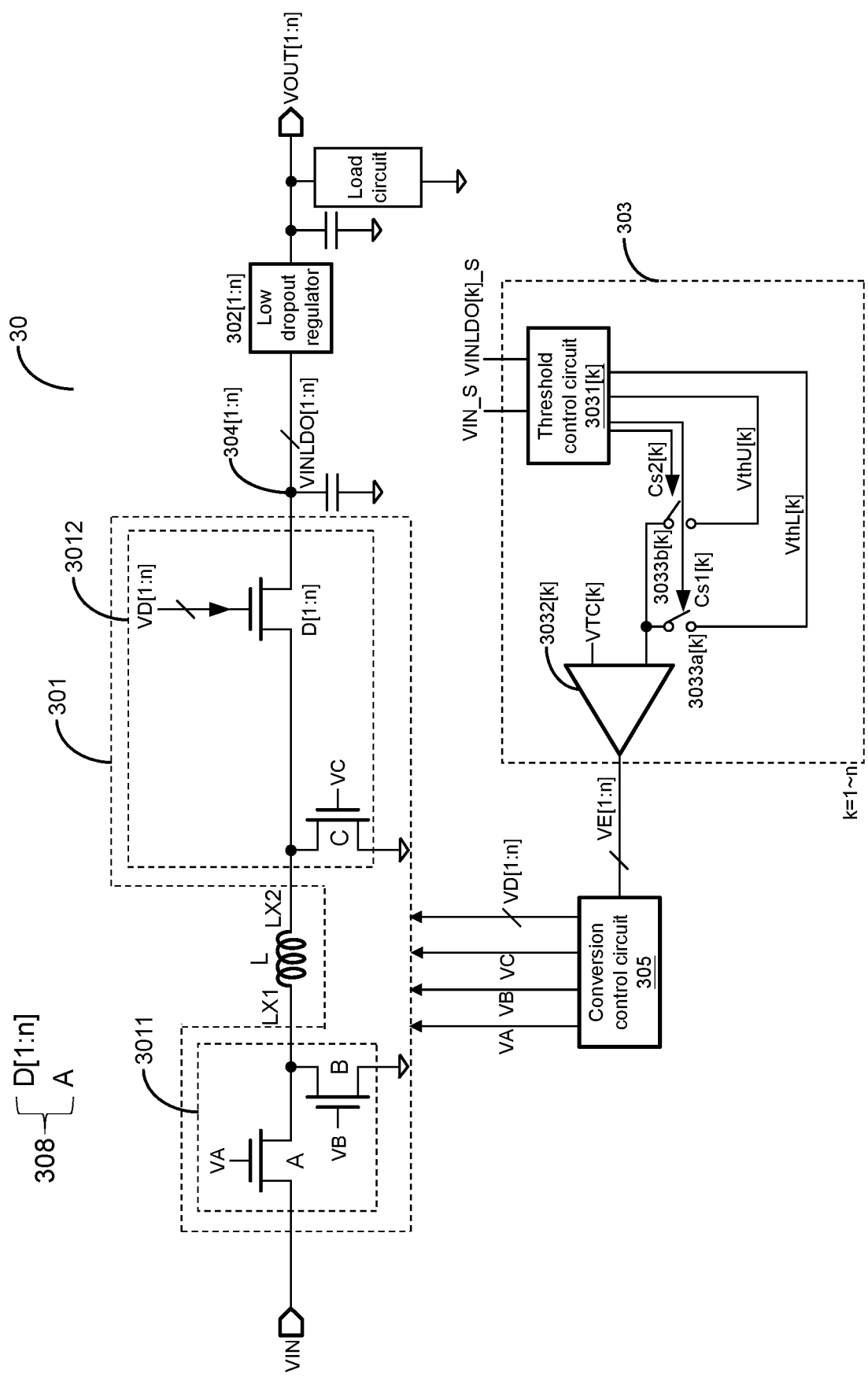
FIG. 3C illustrates a schematic circuit diagram of a buck-boost switching regulator in accordance with still another embodiment of the present invention.

FIG. 3C illustrates a schematic circuit diagram of a buck-boost switching regulator in accordance with still another embodiment of the present invention. An inductor L, a power switch circuit 301 and low dropout regulator(s) 302[1:n] of the present embodiment are similar to the inductor L, the power switch circuit 101 and the low dropout regulator(s) 102[1:n] of FIG. 2, wherein n is a positive integer which is larger than or equal to 1. An input switch unit 3011, an output switch unit 3012 and a bypass control circuit 303 of the present embodiment are similar to the input switch unit 2011, the output switch unit 2012 and the bypass control circuit 203 of FIG. 3A. Therefore, the detailed descriptions thereof are omitted. The difference between the present embodiment and the embodiment of FIG. 3A is that in the bypass mode of the present embodiment, the input high side switch A and the output high side switch(es) D[1:n] are controlled to be on. In other words, the bypass switching circuit 308 of the present embodiment includes the corresponding output high side switch D[1:n] and the input high side switch A of the input switch unit 3011. Therefore, the present embodiment does not need an additional bypass switch, and the layout area of the additional bypass switch can be saved. The bypass control circuit 303 generates and transmits the bypass control signal(s) VE[1:n] to the conversion control circuit 305 when the conversion voltage difference is lower than the reference voltage. The conversion control circuit 305 generates control signals VA, VB, VC and VD[1:n] according to the bypass control signal(s) VE[1:n], to control the corresponding output high side switch(es) D[1:n] and the input high side switch A, so as to electrically connect the input voltage VIN with the corresponding low dropout node(s) 304[1:n] via the inductor L. In one embodiment, the conversion control circuit 305 also controls the aforementioned switch(es) when in other modes (for example the buck mode or the boost mode), so as to perform corresponding power conversion. It should be noted that in the bypass mode of the present embodiment, all the n channels enter the bypass mode at the same time. It should be noted that the bypass control circuit 303 of the buck-boost switching regulator 30 of the present invention is not limited to the structure shown in FIG. 3C and can be any other applicable structure. The structure shown in FIG. 3C is only for illustrating the present invention, not for limiting the broadest scope of the present invention.

Figure 3D:
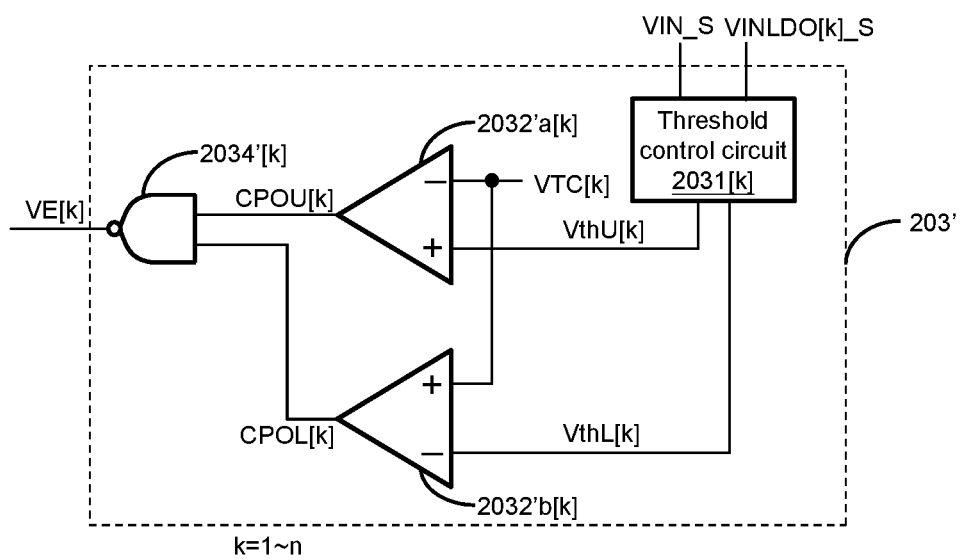
FIG. 3D illustrates a schematic circuit diagram of another embodiment of a bypass control circuit applicable to the buck-boost switching regulators of FIGS. 3A and 3C in accordance with one embodiment of the present invention.

FIG. 3D illustrates a schematic circuit diagram of another embodiment of a bypass control circuit of the buck-boost switching regulator of FIGS. 3A and 3C in accordance with one embodiment of the present invention. A subject signal VTC[k], an upper threshold VthU[k] and a lower threshold VthL[k] of the present embodiment can be as listed in FIG. 3B. The bypass control circuit 203' includes a threshold control circuit 2031[k] and comparison circuits 2032'a[k] and 2032'b[k]. The threshold control circuit 2031[k] is configured to generate the upper threshold VthU[k] and the lower threshold VthL[k] according to the reference voltage. The comparison circuits 2032'a[k] is configured to compare the subject signal VTC[k] with the upper threshold VthU[k], so as to generate a comparison result CPOU[k]. The comparison circuit 2032'b[k] is configured to compare the subject signal VTC[k] with the lower threshold VthL[k], so as to generate a comparison result CPOL[k]. When the subject signal VTC[k] is less than the upper threshold VthU[k] and the subject signal VTC[k] is larger than the lower threshold VthL[k], the bypass control signal VE[k] is enabled via a NAND gate 2034'[k], so as to enter the bypass mode.

Please refer to FIG. 4. In one embodiment, the buck-boost switching regulator of the present invention can operate in the boost mode, the bypass mode or the buck mode. The buck-boost switching regulator of the present invention operates in the bypass mode when the corresponding conversion voltage difference is lower than the reference voltage, and operates in the buck mode or the boost mode respectively according to the input voltage VIN and the corresponding low dropout voltage VINLDO when the corresponding conversion voltage difference is not lower than the reference voltage.

In one embodiment, the reference voltage includes a first reference voltage and a second reference voltage. As shown in FIG. 4, Vref1 represents the first reference voltage; Vref2 represents the second reference voltage; VthU represents the upper threshold' and VthL represents the lower threshold. When the difference of the low dropout voltage VINLDO[k] minus the input voltage VIN is lower than the first reference voltage Vref1 and the difference of the input voltage VIN minus the low dropout voltage VINLDO[k] is lower than the second reference voltage Vref2, the bypass control signal VE[k] is enabled, whereby the buck-boost switching regulator of the present invention operates in the bypass mode. In one embodiment, the buck-boost switching regulator of the present invention operates in the boost mode when the difference of the low dropout voltage VINLDO[k] minus the input voltage VIN is not lower than the first reference voltage Vref1, and operates in the buck mode when the difference of the low dropout voltage VINLDO[k] minus the input voltage VIN is not lower than the second reference voltage Vref2. In one embodiment, the first reference voltage Vref1 and the second reference voltage Vref2 have one of the following relationships: (1) the first reference voltage Vref1 is equal to the second reference voltage Vref2, and both the first reference voltage Vref1 and the second reference voltage Vref2 are not zero; (2) the first reference voltage Vref1 is equal to zero, and the second reference voltage Vref2 is not zero; (3) the second reference voltage Vref2 is equal to zero, and the first reference voltage Vref1 is not zero; or (4) the first reference voltage Vref1 is not equal to the second reference voltage Vref2, and both the first reference voltage Vref1 and the second reference voltage Vref2 are not zero.

Figure 5:
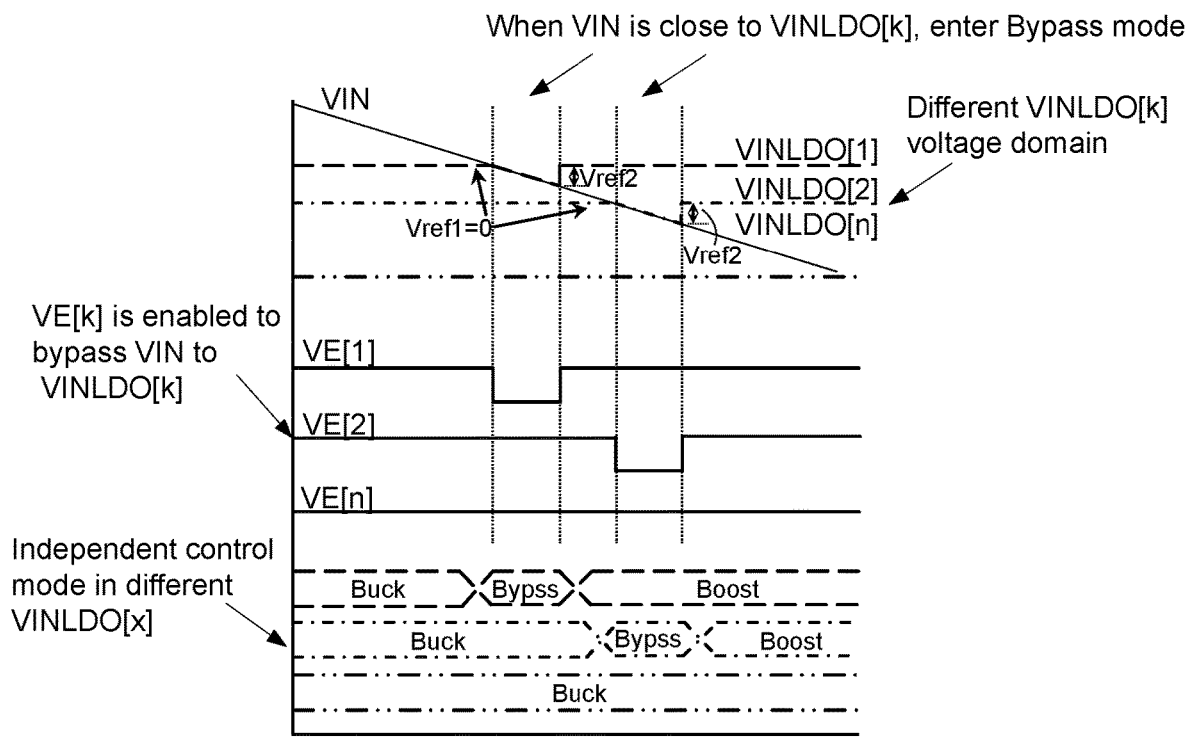
FIG. 5 illustrates a waveform diagram of the circuit of FIG. 3A.

FIG. 5 illustrates a waveform diagram of the circuit of FIG. 3A. The input voltage VIN, the low dropout voltages VINLDO[1], VINLDO[2], VINLDO[n], and the bypass control signals VE[1], VE[2], VE[n] are shown in FIG. 5. It should be noted that what is illustrated in FIG. 5 is an embodiment in which the first reference voltage Vref1 is zero and the second reference voltage Vref2 is not zero. However, this embodiment is not for limiting the broadest scope of the present invention. Also as shown in FIG. 5, please note that there can be only one or some of the channels that enter the bypass mode while the other channels operate in normal mode (i.e., in buck or boost mode without entering the bypass mode).

Figure 6:
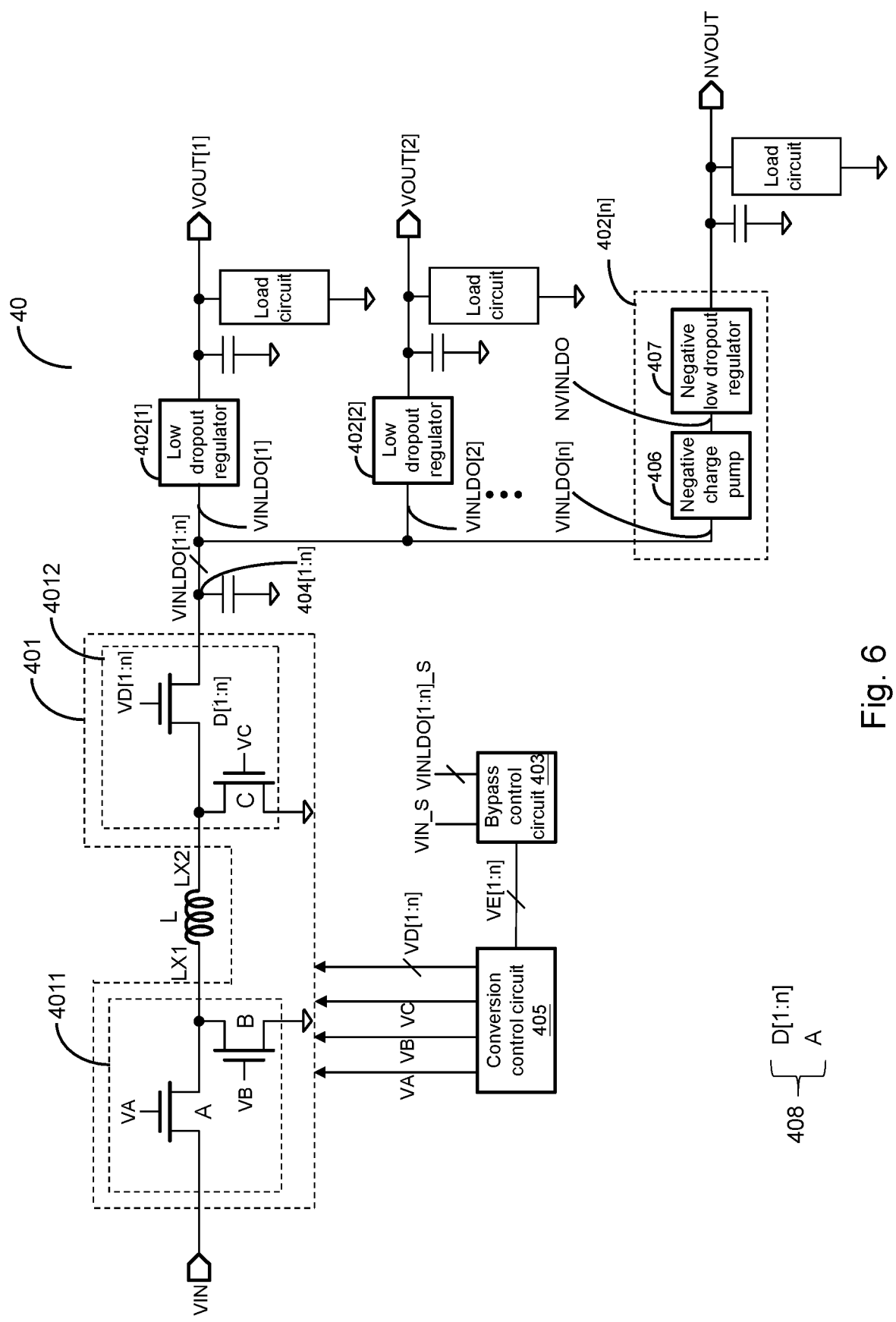
FIG. 6 illustrates a schematic circuit diagram of a buck-boost switching regulator in accordance with yet another embodiment of the present invention.

FIG. 6 illustrates a schematic circuit diagram of a buck-boost switching regulator in accordance with yet another embodiment of the present invention. A power switch circuit 401, an input switch unit 4011, an output switch unit 4012, low dropout regulators 402[1], 402[2], an inductor L, a bypass control circuit 403, a conversion control circuit 405 and a bypass switching circuit 408 of the present embodiment are similar to the power switch circuit 301, the input switch unit 3011, the output switch unit 3012, the low dropout regulator(s) 302[1]~302[n], the inductor L, the bypass control circuit 303, the conversion control circuit 305 and the bypass switching circuit 308 of FIG. 3C; therefore, the detailed descriptions thereof are omitted. The bypass control circuit 403 of the present embodiment can be a circuit as shown by the embodiment of FIG. 3D, and the bypass switching circuit 408 of the present embodiment can be a circuit as shown by the embodiment of FIG. 3A. The difference between the present embodiment and the embodiment of FIG. 3C is that one low dropout regulator of the buck-boost switching regulator 40 of the present embodiment corresponds to a negative voltage generator circuit 402[n] configured to convert the low dropout voltage VINLDO[n] into a negative output voltage NVOUT (which corresponds to the output voltage VOUT[n]), wherein the negative voltage generator circuit 402[n] includes a negative charge pump 406 and a negative low dropout regulator 407. The negative charge pump 406 is coupled to the low dropout node 404[n], and is configured to convert the low dropout voltage VINLDO[n] into a negative low dropout voltage NVINLDO. The negative low dropout regulator 407 is coupled to the negative charge pump 406 and is configured to convert the negative low dropout voltage NVINLDO into a negative output voltage NVOUT. In the present embodiment, n is a positive integer which is larger than or equal to 2.

Figure 7:
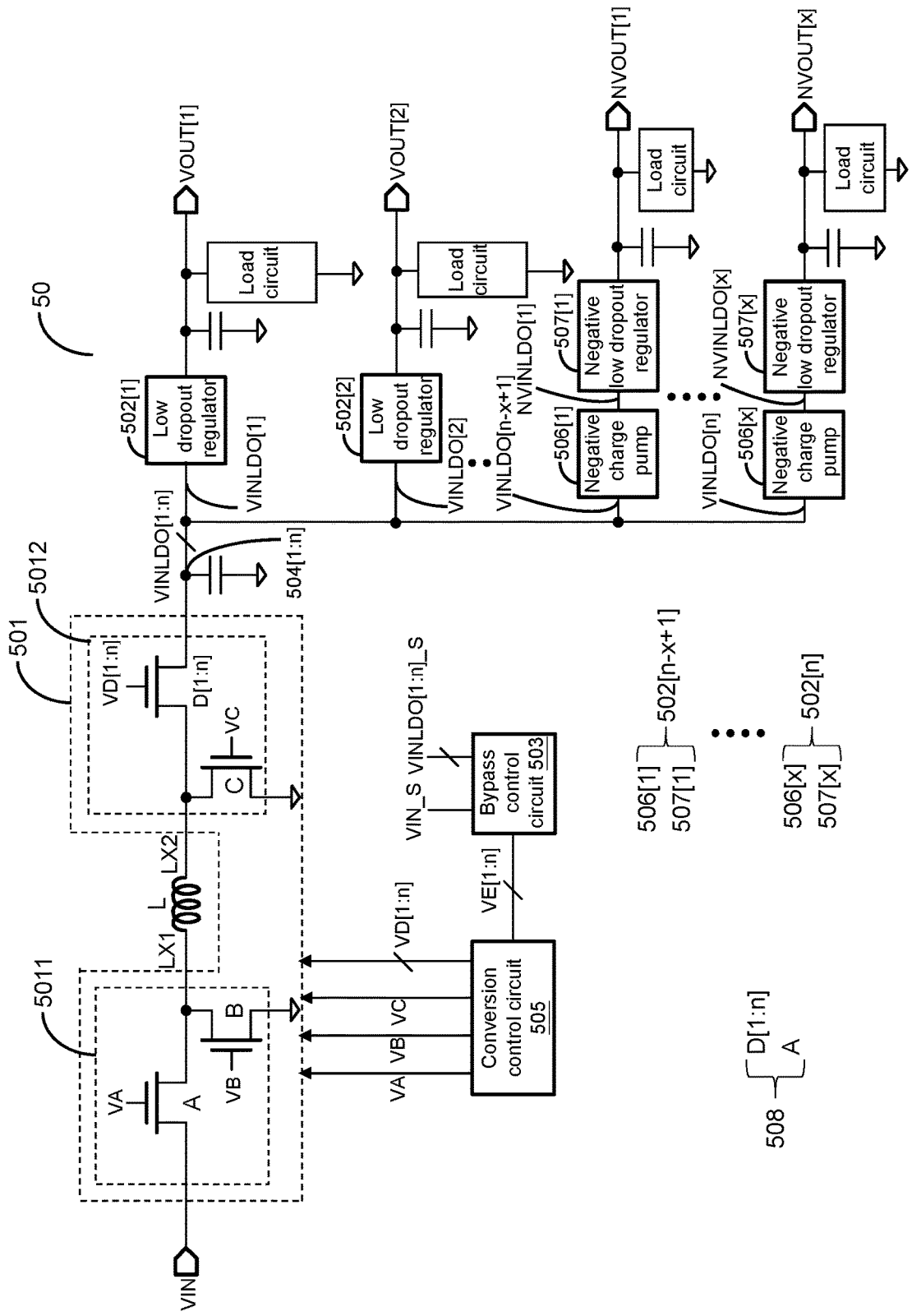
FIG. 7 illustrates a schematic circuit diagram of a buck-boost switching regulator in accordance with still another embodiment of the present invention.

FIG. 7 illustrates a schematic circuit diagram of a buck-boost switching regulator in accordance with still another embodiment of the present invention. A power switch circuit 501, an input switch unit 5011, an output switch unit 5012, low dropout regulators 502[1], 502[2], an inductor L, a bypass control circuit 503, a conversion control circuit 505 and a bypass switching circuit 508 of the present embodiment are similar to the power switch circuit 301, the input switch unit 3011, the output switch unit 3012, the low dropout regulator(s) 302[1]~302[n], the inductor L, the bypass control circuit 303, the conversion control circuit 305 and the bypass switching circuit 308 of FIG. 3C; therefore, the detailed descriptions thereof are omitted. The bypass control circuit 503 of the present embodiment can be a circuit as shown by the embodiment of FIG. 3D, and the bypass switching circuit 508 of the present embodiment can be a circuit as shown by the embodiment of FIG. 3A. The difference between the present embodiment and the embodiment of FIG. 3C is that part of the plural low dropout regulators of the buck-boost switching regulator 50 of the present embodiment correspond to negative voltage generator circuits 502[n−x+1]~502[n] configured to respectively convert the low dropout voltages VINLDO[n−x+1]~VINLDO[n] into negative output voltages NVOUT[1]~NVOUT[x] (which respectively correspond to the output voltages VOUT[n−x+1]~VOUT[n]), wherein the negative voltage generator circuits 502[n−x+1]~502[n] respectively include negative charge pumps 506[1]~506[x] and negative low dropout regulators 507[1]~507[x]. The plural negative charge pumps 506[1]~506[x] are respectively coupled to the corresponding low dropout nodes 504[n−x+1]~504[n], and are configured to respectively convert the corresponding low dropout voltages VINLDO[n−x+1]~VINLDO[n] into corresponding negative low dropout voltages NVINLDO[1]~NVINLDO[x]. The negative low dropout regulators 507[1]~507[x] are respectively coupled to the corresponding negative charge pumps 506[1]~506[x] and are configured to respectively convert the corresponding negative low dropout voltages NVINLDO[1]~NVINLDO[x] into corresponding negative output voltages NVOUT[1]~NVOUT[x], wherein x is a positive integer which is larger than or equal to 1. In the present embodiment, n is a positive integer which is larger than or equal to 3.

Figure 8:
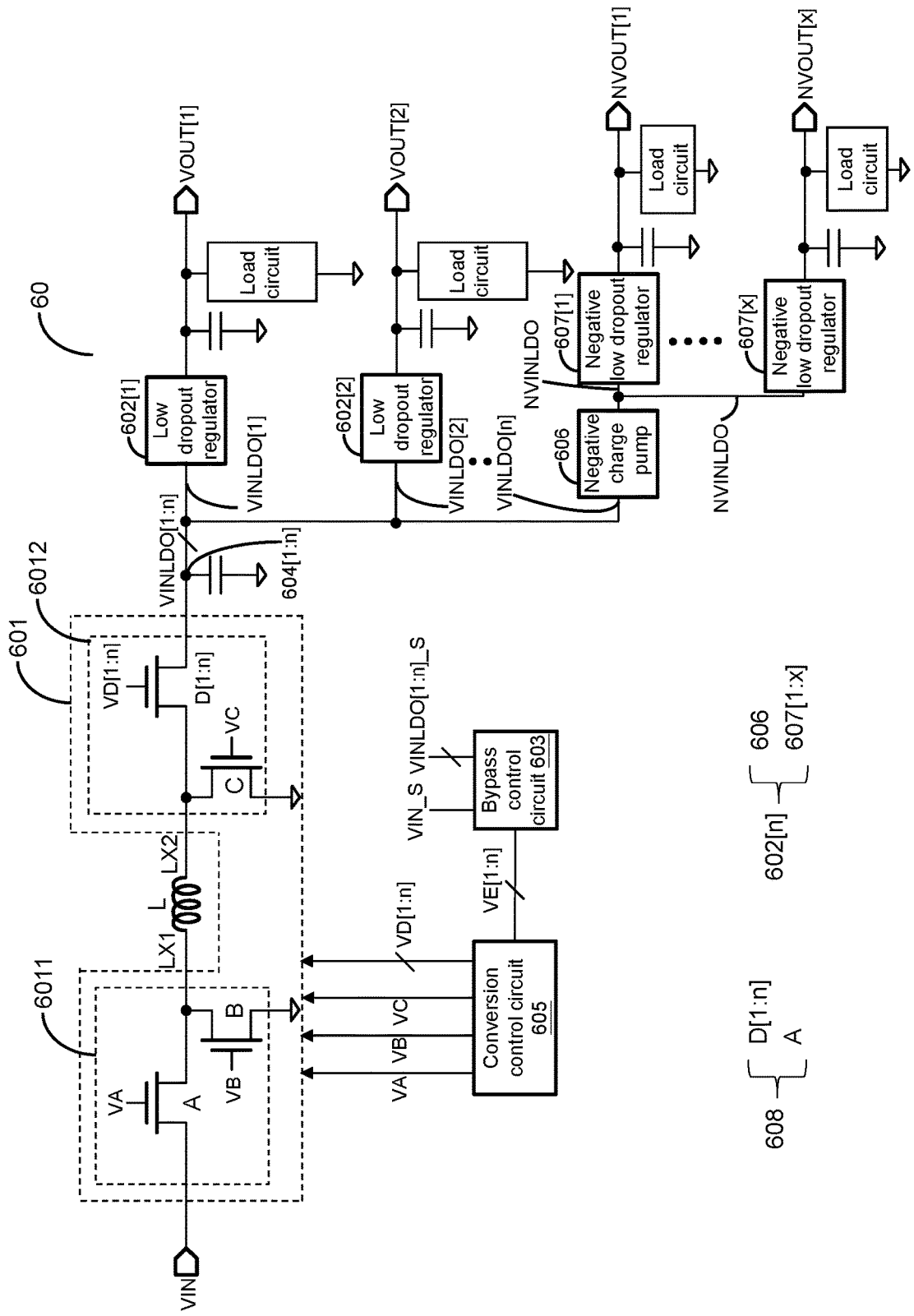
FIG. 8 illustrates a schematic circuit diagram of a buck-boost switching regulator in accordance with yet another embodiment of the present invention.

FIG. 8 illustrates a schematic circuit diagram of a buck-boost switching regulator in accordance with yet another embodiment of the present invention. A power switch circuit 601, an input switch unit 6011, an output switch unit 6012, low dropout regulators 602[1], 602[2], an inductor L, a bypass control circuit 603, a conversion control circuit 605 and a bypass switching circuit 608 of the present embodiment are similar to the power switch circuit 301, the input switch unit 3011, the output switch unit 3012, the low dropout regulator(s) 302[1]~302[n], the inductor L, the bypass control circuit 303, the conversion control circuit 305 and the bypass switching circuit 308 of FIG. 3C; therefore, the detailed descriptions thereof are omitted. The bypass control circuit 603 of the present embodiment can be a circuit as shown by the embodiment of FIG. 3D, and the bypass switching circuit 608 of the present embodiment can be a circuit as shown by the embodiment of FIG. 3A. The difference between the present embodiment and the embodiment of FIG. 3C is that one low dropout regulator of the buck-boost switching regulator 60 of the present embodiment corresponds to a negative voltage generator circuit 602[n] configured to convert the low dropout voltage VINLDO[n] into at least one negative output voltage NVOUT[1]~NVOUT[x] (which corresponds to the output voltage VOUT[n], i.e., the output voltage VOUT[n] can include plural outputs), wherein the negative voltage generator circuit 602[n] includes a negative charge pump 606 and at least one negative low dropout regulator 607[1]~607[x]. The negative charge pump 606 is coupled to the low dropout node 604[n], and is configured to convert the low dropout voltage VINLDO[n] into a negative low dropout voltage NVINLDO. The plural negative low dropout regulators 607[1]~607[x] are coupled to the negative charge pump 606 and are configured to convert the negative low dropout voltage NVINLDO into corresponding negative output voltages NVOUT[1]~NVOUT[x], respectively. In the present embodiment, n is a positive integer which is larger than or equal to 2.

Figure 9:
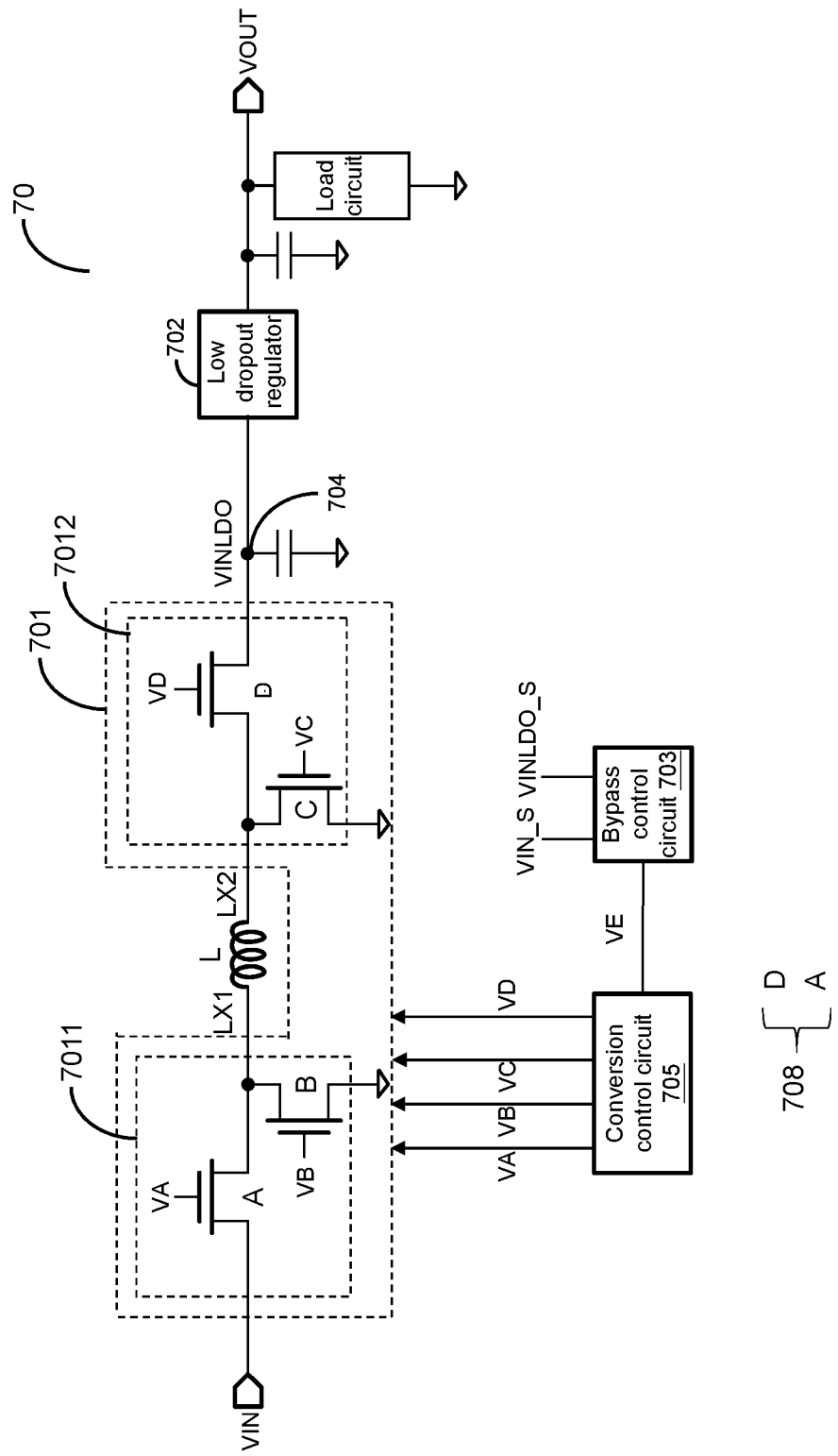
FIG. 9 illustrates a schematic circuit diagram of a buck-boost switching regulator in accordance with still another embodiment of the present invention.

FIG. 9 illustrates a schematic circuit diagram of a buck-boost switching regulator in accordance with still another embodiment of the present invention. The difference between the present embodiment and FIG. 3C is that the present embodiment only includes one single output high side switch D and one single low dropout regulator 702. An input switch unit 7011, an output low side switch C, a low dropout regulator 702 and a conversion control circuit 705 of the present embodiment are similar to the input switch unit 3011, the output low side switch C, the low dropout regulator(s) 302[1:n] and the conversion control circuit 305 of FIG. 3C, but n in the present embodiment is 1. The detailed descriptions of these components are omitted. The bypass control circuit 703 of the present embodiment can be a circuit as shown by the embodiment of FIG. 3C or 3D. The bypass control circuit 703 generates a bypass control signal VE which is sent to the conversion control circuit 705. The conversion control circuit 705 generates control signals VA, VB, VC and VD according to the bypass control signal VE to control the output high side switch D and the input high side switch A, so as to electrically connect the input voltage VIN and the low dropout node 704 via the inductor L.

Figure 10:
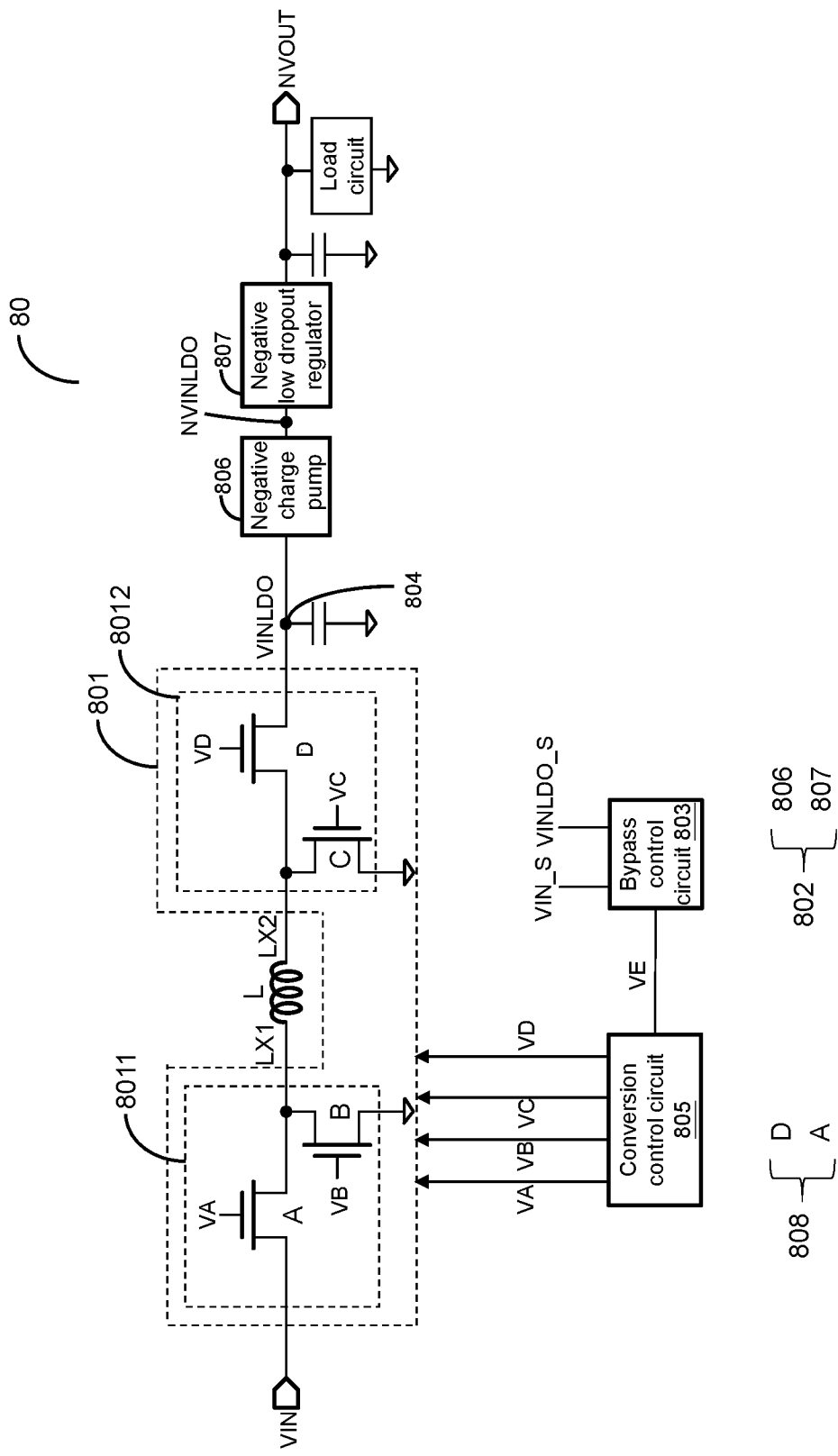
FIG. 10 illustrates a schematic circuit diagram of a buck-boost switching regulator in accordance with yet another embodiment of the present invention.

FIG. 10 illustrates a schematic circuit diagram of a buck-boost switching regulator in accordance with yet another embodiment of the present invention. The difference between the present embodiment and the embodiment of FIG. 6 is that the present embodiment only includes one single output high side switch D, and the single low dropout regulator of the present embodiment corresponds to a negative voltage generator circuit 802. An input switch unit 8011, an output low side switch C, a conversion control circuit 805, a bypass control circuit 803, a negative voltage generator circuit 802, a negative charge pump 806 and a negative low dropout regulator 807 of the present embodiment are similar to the input switch unit 4011, the output low side switch C, the conversion control circuit 405, the bypass control circuit 403, the negative voltage generator circuit 402[n], the negative charge pump 406 and the negative low dropout regulator 407 of FIG. 6; therefore, the detailed descriptions thereof are omitted. The bypass control circuit 803 of the present embodiment can be a circuit as shown by the embodiment of FIG. 3C or 3D. The bypass control circuit 803 generates a bypass control signal VE which is sent to the conversion control circuit 805. The conversion control circuit 805 generates control signals VA, VB, VC and VD according to the bypass control signal VE to control the output high side switch D and the input high side switch A, so as to electrically connect the input voltage VIN and the low dropout node 804 via the inductor L.

Figure 11:
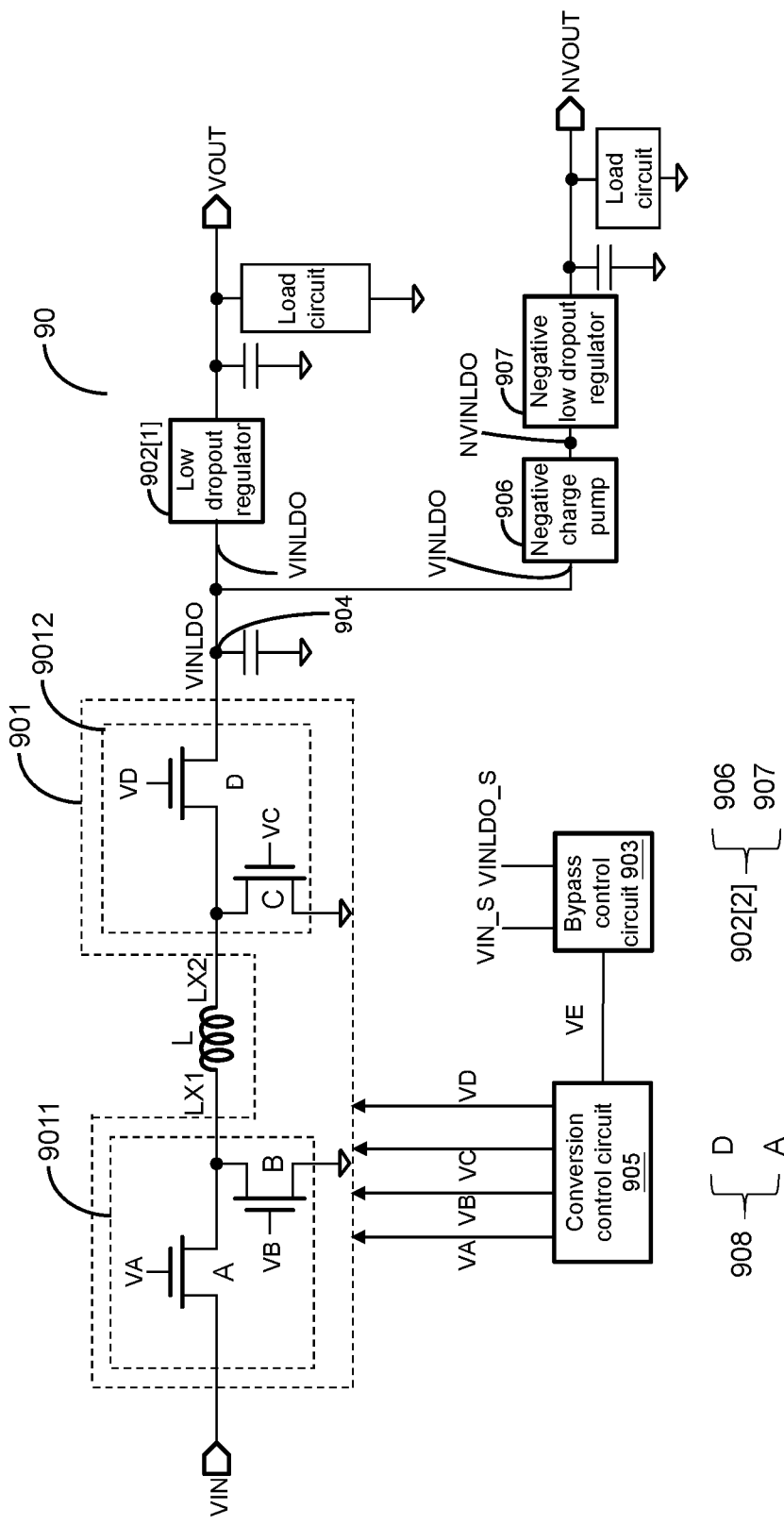
FIG. 11 illustrates a schematic circuit diagram of a buck-boost switching regulator in accordance with still another embodiment of the present invention.

FIG. 11 illustrates a schematic circuit diagram of a buck-boost switching regulator in accordance with still another embodiment of the present invention. The difference between the present embodiment and the embodiment of FIG. 6 is that the present embodiment only includes one single output high side switch D, and the present embodiment only includes one low dropout regulator 902[1] and another low dropout regulator (which corresponds to a negative voltage generator circuit 902[2]). The bypass control circuit 903 of the present embodiment can be a circuit as shown by the embodiment of FIG. 3C or 3D. An input switch unit 9011, an output low side switch C, a conversion control circuit 905, a bypass control circuit 903, a low dropout regulator 902[1], a negative voltage generator circuit 902[2], a negative charge pump 906 and a negative low dropout regulator 907 of the present embodiment are similar to the input switch unit 4011, the output low side switch C, the conversion control circuit 405, the bypass control circuit 403, the low dropout regulator 402[1], the negative voltage generator circuit 402[n], the negative charge pump 406 and the negative low dropout regulator 407 of FIG. 6; therefore, the detailed descriptions thereof are omitted. The bypass control circuit 903 generates a bypass control signal VE which is sent to the conversion control circuit 905. The conversion control circuit 905 generates control signals VA, VB, VC and VD according to the bypass control signal VE to control the output high side switch D and the input high side switch A, so as to electrically connect the input voltage VIN and the low dropout node 904 via the inductor L.

Figure 12A:
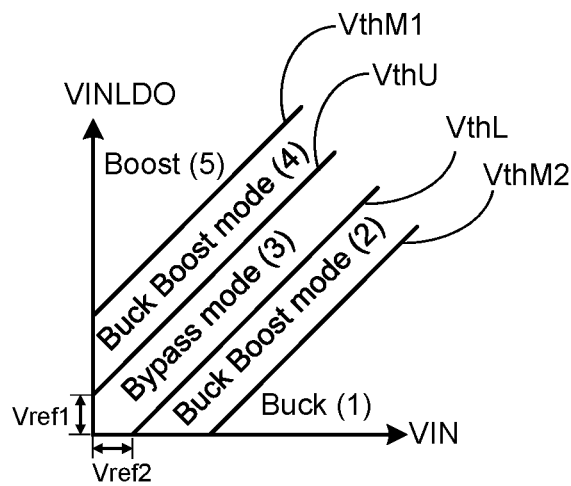
FIG. 12A illustrates a characteristic diagram of operation modes of the buck-boost switching regulator in accordance with one embodiment of the present invention.
Figure 12B:
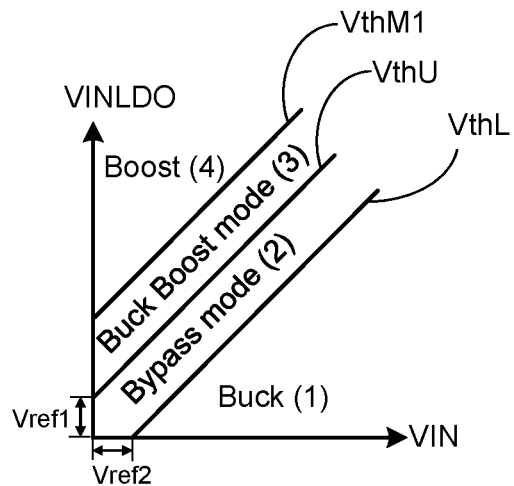
FIG. 12B illustrates a characteristic diagram of operation modes of the buck-boost switching regulator in accordance with another embodiment of the present invention.
Figure 12C:
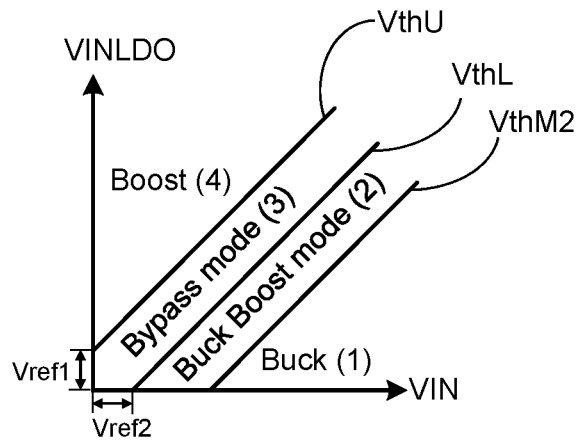
FIG. 12C illustrates a characteristic diagram of operation modes of the buck-boost switching regulator in accordance with still another embodiment of the present invention.

FIGS. 12A-12C illustrate characteristic diagrams of operation modes of the buck-boost switching regulator in accordance with several embodiments of the present invention. It should be noted that FIG. 12A, FIG. 12B or FIG. 12C can be applied to any of the embodiments of FIGS. 3A, 3C and 6-11. Likely, FIG. 4 also can be applied to any of the embodiments of FIGS. 3A, 3C and 6-11.

Referring to FIG. 12A, Vref1 represents the first reference voltage; Vref2 represents the second reference voltage; VthU represents the upper threshold; VthL represents the lower threshold, VthM1 represents a first middle threshold; and VthM2 represents a second middle threshold. The difference between the present embodiment and FIG. 4 is that the buck-boost switching regulator of the present embodiment can further operate in a buck-boost mode according to the input voltage VIN and the corresponding low dropout voltage VINLDO when the corresponding conversion voltage difference is not lower than the reference voltage. As shown in FIG. 12A, when the conversion voltage difference (e.g. VINLDO−VIN) varies from higher to lower, the buck-boost switching regulator operates in a corresponding mode according to the following listed order: the boost mode, the buck-boost mode, the bypass mode, the buck-boost mode, and the buck mode.

Referring to FIG. 12B, Vref1 represents the first reference voltage, Vref2 represents the second reference voltage; VthU represents the upper threshold; VthL represents the lower threshold; and VthM1 represents the first middle threshold. The difference between the present embodiment and the embodiment of FIG. 12A is that in the present embodiment, there is only the buck-boost mode above the bypass mode. As shown in FIG. 12B, when the conversion voltage difference (e.g. VINLDO−VIN) varies from higher to lower, the buck-boost switching regulator operates in a corresponding mode according to the following listed order: the boost mode, the buck-boost mode, the bypass mode, the buck mode.

FIG. 12C illustrates a characteristic diagram of operation modes of the buck-boost switching regulator in accordance with still another embodiment of the present invention. Referring to FIG. 12C, Vref1 represents the first reference voltage; Vref2 represents the second reference voltage; VthU represents the upper threshold; VthL represents the lower threshold; and VthM2 represents the second middle threshold. The difference between the present embodiment and the embodiment of FIG. 12A is that in the present embodiment, there is only the buck-boost mode below the bypass mode. As shown in FIG. 12C, when the conversion voltage difference (e.g. VINLDO−VIN) varies from higher to lower, the buck-boost switching regulator operates in a corresponding mode according to the following listed order: the boost mode, the bypass mode, the buck-boost mode, the buck mode.

Figure 13:
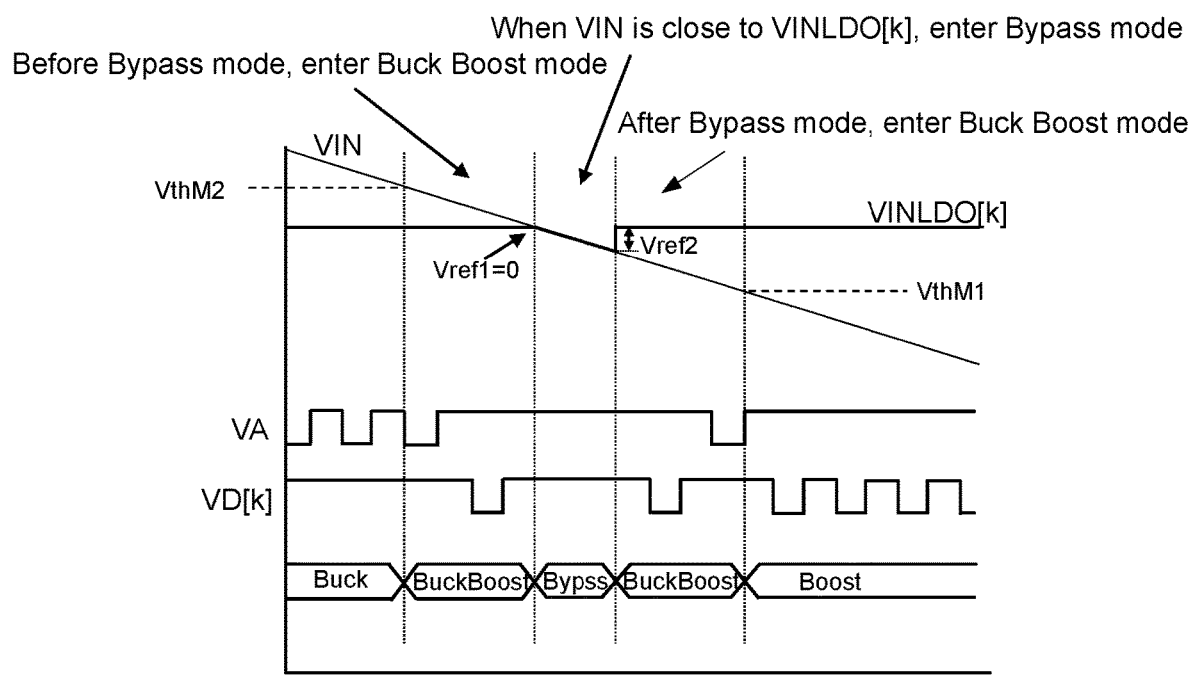
FIG. 13 illustrates a waveform diagram of the circuit of FIG. 3C operating in the operation modes of FIG. 12A in accordance with one embodiment of the present invention.

FIG. 13 illustrates a waveform diagram of the circuit of FIG. 3C operating in the operation modes of FIG. 12A in accordance with one embodiment of the present invention. The input voltage VIN, the low dropout voltage VINLDO[k] and the control signals VA, VD[k] are shown in FIG. 13. It should be noted that what is illustrated in FIG. 13 is an embodiment in which the first reference voltage Vref1 is zero and the second reference voltage Vref2 is not zero; however, this embodiment is not for limiting the broadest scope of the present invention. Specifically, in the buck mode, the corresponding output high side switch D[k] is always on; in the shown embodiment, the corresponding control signal VD[k] is always at high level as shown in FIG. 13. The input high side switch A is switching to perform buck conversion. In the buck-boost mode, the corresponding output high side switch D[k] and the input high side switch A are both switching to perform buck-boost conversion. In the bypass mode, the corresponding output high side switch D[k] and the input high side switch A are always on, so as to electrically connect the input voltage VIN and the corresponding low dropout voltage VINLDO[k] via the inductor L. In the boost mode, the input high side switch A is always on, and the corresponding output high side switch D[k] is switching to perform boost conversion.

Figure 14:
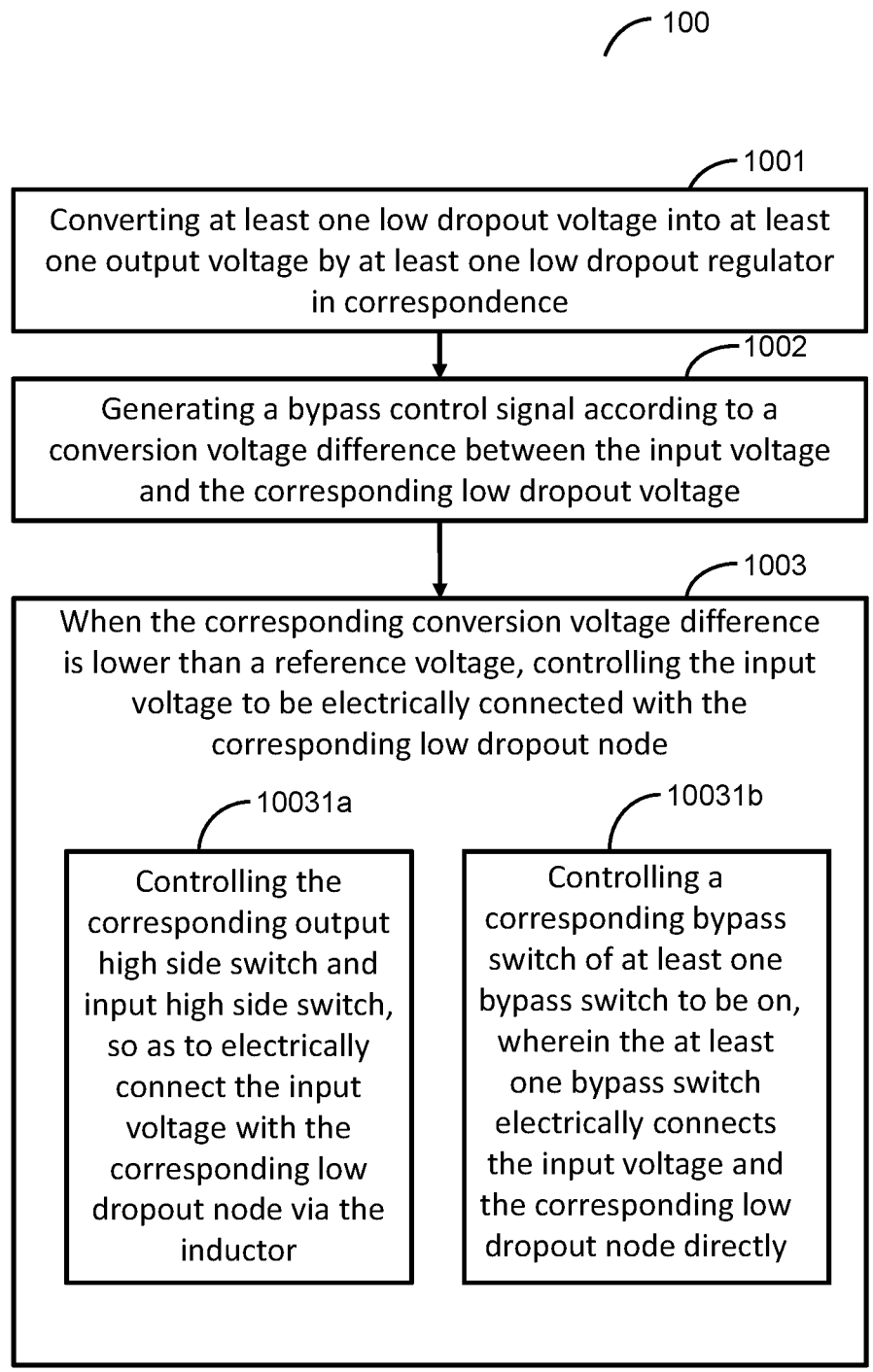
FIG. 14 illustrates a method for controlling a buck-boost switching regulator in accordance with yet another embodiment of the present invention.

FIG. 14 illustrates a method for controlling a buck-boost switching regulator in accordance with yet another embodiment of the present invention. The method 100 for controlling the buck-boost switching regulator of the present invention includes: first, at step 1001, coupling at least one low dropout regulator to at least one output high side switch in correspondence, so as to correspondingly convert at least one low dropout voltage VINLDO into at least one output voltage VOUT. Subsequently, at step 1002, a bypass control signal is generated according to a conversion voltage difference between an input voltage VIN and the corresponding low dropout voltage VINLDO. Next, at step 1003, when the corresponding conversion voltage difference is lower than a reference voltage, the bypass control signal controls the input voltage VIN to be electrically connected with the corresponding low dropout node. In one embodiment, step 1003 may include step 10031a or step 10031b. At step 10031a, when the corresponding conversion voltage difference is lower than the reference voltage, the bypass control signal controls the corresponding output high side switch and input high side switch to electrically connect the input voltage VIN with the corresponding low dropout node via an inductor. At step 10031b, when the corresponding conversion voltage difference is lower than the reference voltage, a corresponding bypass switch of at least one bypass switch is turned on, so as to electrically connect the input voltage VIN with the corresponding low dropout node directly.

Figure 15:
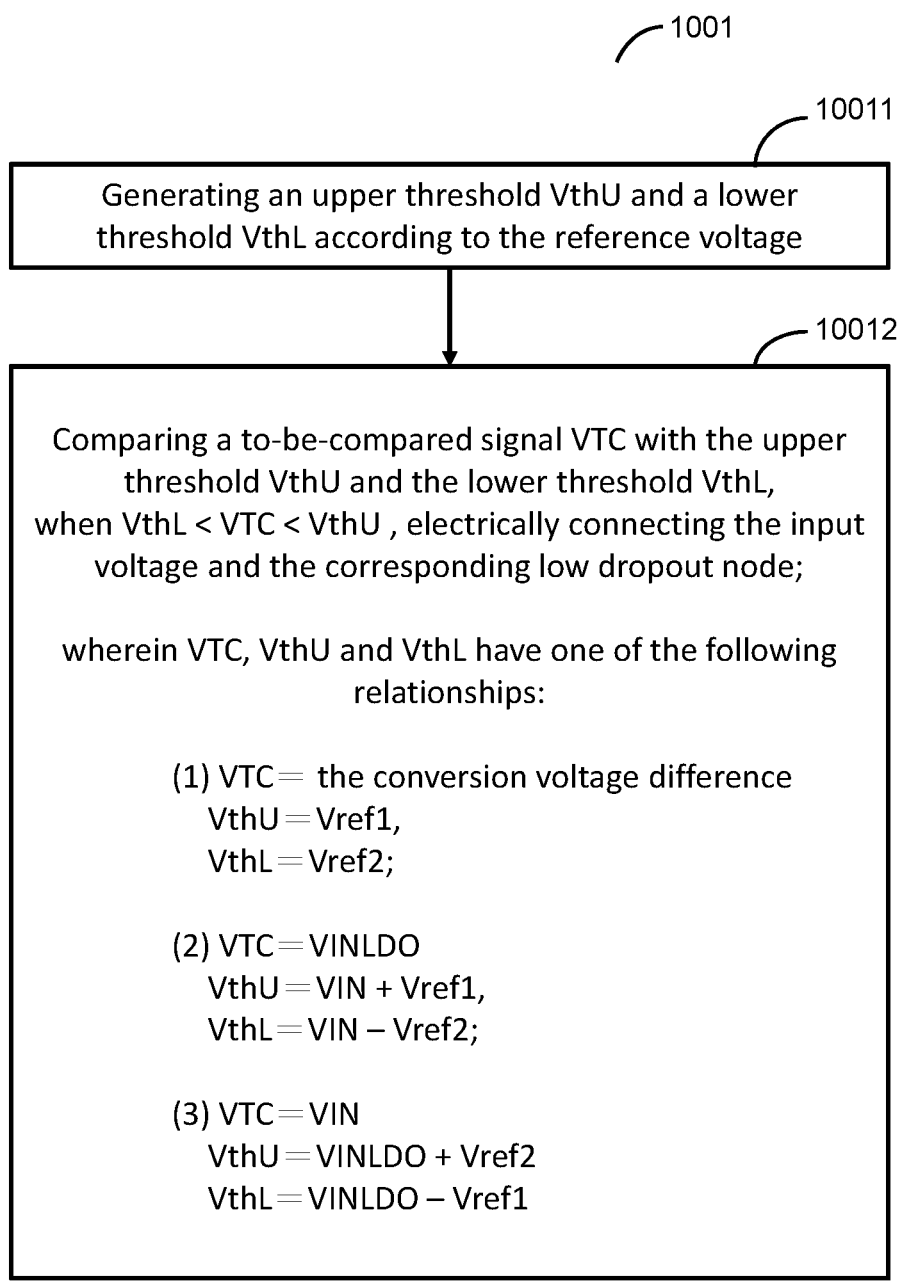
FIG. 15 illustrates a method for controlling a buck-boost switching regulator in accordance with still another embodiment of the present invention.

FIG. 15 illustrates a method for controlling a buck-boost switching regulator in accordance with still another embodiment of the present invention. In one embodiment, step 1001 may include step 10011 and step 10012. At step 10011, an upper threshold VthU and a lower threshold VthL are generated according to the reference voltage. At step 10012, a subject signal VTC is compared with the upper threshold VthU and the lower threshold VthL. When the subject signal VTC is between the upper threshold VthU and the lower threshold VthL, the corresponding bypass control signal is enabled, so as to electrically connect the input voltage VIN with the corresponding low dropout node, wherein the subject signal, the upper threshold VthU and the lower threshold VthL have one of the following relationships: (1) the subject signal VTC is the corresponding conversion voltage difference, the upper threshold VthU is the first reference voltage Vref1 and the lower threshold VthL is the second reference voltage Vref2; (2) the subject signal VTC is the corresponding low dropout voltage VINLDO, the upper threshold VthU is the sum of the input voltage VIN and the first reference voltage Vref1, and the lower threshold VthL is the difference between the input voltage VIN and the second reference voltage Vref2; (3) the subject signal VTC is the input voltage VIN, the upper threshold VthU is the sum of the corresponding low dropout voltage VINLDO and the second reference voltage Vref2, and the lower threshold VthL is the difference between the corresponding low dropout voltage VINLDO and the first reference voltage Vref1.

As described above, the present invention provides a buck-boost switching regulator and a method for controlling the same, which has smaller switching loss and higher efficiency via the bypass mode when the input voltage is close to the low dropout voltage, and provides more LDO headroom because the input voltage is directly bypassed to the input terminal of the low dropout regulator. Furthermore, the present invention can save the layout area of the bypass switch via the bypass mode in which the input high side switch and the output high side switch are always on.

The present invention has been described in considerable detail with reference to certain preferred embodiments thereof. It should be understood that the description is for illustrative purpose, not for limiting the broadest scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, under the spirit of the present invention, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. In view of the foregoing, the scope of the present invention should cover all such and other modifications and variations, which should be interpreted to fall within the scope of the following claims and their equivalents.

What is claimed is:

1. A buck-boost switching regulator for converting an input voltage into at least one output voltage, the buck-boost switching regulator comprising:
- a power switch circuit including an input switch unit and an output switch unit, wherein the input switch unit is configured to operably switch a first terminal of an inductor between the input voltage and a ground level, and the output switch unit is configured to operably switch a second terminal of the inductor between at least one low dropout node and the ground level, so as to convert the input voltage at the at least one low dropout node into at least one corresponding low dropout voltage, wherein the at least one low dropout node is correspondingly coupled to at least one output high side switch of the output switch unit;
- at least one low dropout regulator correspondingly coupled to the at least one output high side switch to correspondingly convert the at least one low dropout voltage into the at least one output voltage;
- a bypass control circuit configured to operably generate a bypass control signal according to a conversion voltage difference between the input voltage and the corresponding low dropout voltage; and
- a bypass switching circuit, wherein when the corresponding conversion voltage difference is lower than a reference voltage, the bypass control signal controls the bypass switching circuit to electrically connect the input voltage with the corresponding low dropout node, such that the buck-boost switching regulator operates in a bypass mode;
- wherein the reference voltage includes a first reference voltage and a second reference voltage, wherein the corresponding bypass control signal is enabled when a difference of the corresponding low dropout voltage minus the input voltage is lower than the first reference voltage and a difference of the input voltage minus the corresponding low dropout voltage is lower than the second reference voltage, wherein the first reference voltage and the second reference voltage have one of the following relationships:
  - (1) the first reference voltage is equal to the second reference voltage, and both the first reference voltage and the second reference voltage are not zero;
  - (2) the first reference voltage is equal to zero, and the second reference voltage is not zero;
  - (3) the second reference voltage is equal to zero, and the first reference voltage is not zero; or
  - (4) the first reference voltage is not equal to the second reference voltage, and both the first reference voltage and the second reference voltage are not zero.

2. The buck-boost switching regulator of claim 1, wherein the bypass switching circuit includes the corresponding output high side switch and an input high side switch of the input switch unit, and the bypass control circuit generates the corresponding bypass control signal to control the corresponding output high side switch and the input high side switch to be both turned on when the corresponding conversion voltage difference is lower than the reference voltage, so as to electrically connect the input voltage with the corresponding low dropout node via the inductor.

3. The buck-boost switching regulator of claim 1, wherein the bypass switching circuit includes at least one bypass switch which is directly electrically connected between the input voltage and the corresponding low dropout node, and this bypass switch is controlled to be turned on when the corresponding conversion voltage difference is lower than the reference voltage, so as to electrically connect the input voltage with the corresponding low dropout node directly.

4. The buck-boost switching regulator of claim 1, wherein the conversion voltage difference is an absolute value of a difference between the input voltage and the corresponding low dropout voltage.

5. The buck-boost switching regulator of claim 1, wherein the bypass control circuit includes:
- a threshold control circuit configured to operably generate an upper threshold and a lower threshold according to the reference voltage; and
- a comparison circuit configured to operably compare a subject signal with the upper threshold and the lower threshold, wherein the corresponding bypass control signal is enabled when the subject signal is between the upper threshold and the lower threshold, so as to electrically connect the input voltage with the corresponding low dropout node, wherein the subject signal, the upper threshold and the lower threshold have one of the following relationships:
  - (1) the subject signal is the corresponding conversion voltage difference, the upper threshold is the first reference voltage and the lower threshold is the second reference voltage;
  - (2) the subject signal is the corresponding low dropout voltage, the upper threshold is a sum of the input voltage and the first reference voltage, and the lower threshold is a difference between the input voltage and the second reference voltage; or
  - (3) the subject signal is the input voltage, the upper threshold is a sum of the corresponding low dropout voltage and the second reference voltage, and the lower threshold is a difference between the corresponding low dropout voltage and the first reference voltage.

6. The buck-boost switching regulator of claim 1, wherein the input switch unit includes:
- an input high side switch coupled between the input voltage and the first terminal of the inductor; and
- an input low side switch or an input low side diode coupled between the ground level and the first terminal of the inductor;
- wherein the input high side switch and the input low side switch or the input low side diode are configured to operably switch the first terminal of the inductor between the input voltage and the ground level.

7. The buck-boost switching regulator of claim 1, wherein the output switch unit includes:
- an output low side switch coupled between the ground level and the second terminal of the inductor; and
- the at least one output high side switch, respectively and correspondingly coupled between the at least one low dropout node and the second terminal of the inductor;
- wherein the output low side switch and the at least one output high side switch are configured to operably switch the second terminal of the inductor between the at least one low dropout node and the ground level, so as to generate the at least one corresponding low dropout voltage at the at least one low dropout node.

8. The buck-boost switching regulator of claim 1, wherein the buck-boost switching regulator is further operable in a buck mode and in a boost mode respectively according to the input voltage and the corresponding low dropout voltage when the corresponding conversion voltage difference is not lower than the reference voltage and is not equal to zero.

9. The buck-boost switching regulator of claim 8, wherein the buck-boost switching regulator operates in the boost mode when a difference of the corresponding low dropout voltage minus the input voltage is not lower than the first reference voltage, and the buck-boost switching regulator operates in the buck mode when a difference of the input voltage minus the corresponding low dropout voltage is not lower than the second reference voltage.

10. The buck-boost switching regulator of claim 8, wherein the buck-boost switching regulator is further operable in a buck-boost mode according to the input voltage and the corresponding low dropout voltage when the corresponding conversion voltage difference is not lower than the reference voltage and is not equal to zero.

11. The buck-boost switching regulator of claim 10, wherein the buck-boost switching regulator operates in a corresponding mode according to one of the following listed orders when the conversion voltage difference changes from higher to lower:
   (1) the boost mode, the buck-boost mode, the bypass mode, and the buck mode;
   (2) the boost mode, the bypass mode, the buck-boost mode, and the buck mode; or
   (3) the boost mode, the buck-boost mode, the bypass mode, the buck-boost mode, and the buck mode.

12. The buck-boost switching regulator of claim 1, wherein the at least one low dropout regulator is a negative voltage generator circuit, wherein the negative voltage generator circuit includes:
   a negative charge pump coupled to the corresponding low dropout node, wherein the negative charge pump is configured to operably convert the corresponding low dropout voltage into a negative low dropout voltage; and
   at least one negative low dropout regulator coupled to the negative charge pump, wherein the at least one negative low dropout regulator is configured to operably convert the negative low dropout voltage into at least one corresponding negative output voltage.

13. A method for controlling a buck-boost switching regulator to convert an input voltage into at least one output voltage, the buck-boost switching regulator including a power switch circuit, the power switch circuit including an input switch unit and an output switch unit, wherein the input switch unit is configured to operably switch a first terminal of an inductor between the input voltage and a ground level, and the output switch unit is configured to operably switch a second terminal of the inductor between at least one low dropout node and the ground level, so as to convert the input voltage at the at least one low dropout node into at least one corresponding low dropout voltage, and the at least one low dropout node is correspondingly coupled to at least one output high side switch of the output switch unit; the method comprising:
   converting the at least one low dropout voltage into the at least one output voltage by at least one low dropout regulator in correspondence;
   generating a bypass control signal according to a conversion voltage difference between the input voltage and the corresponding low dropout voltage; and
   when the corresponding conversion voltage difference is lower than a reference voltage, the bypass control signal controlling the input voltage to be electrically connected with the corresponding low dropout node, such that the buck-boost switching regulator operates in a bypass mode;
   wherein the reference voltage includes a first reference voltage and a second reference voltage, wherein the corresponding bypass control signal is enabled when a difference of the low dropout voltage minus the input voltage is lower than the first reference voltage and a difference of the input voltage minus the low dropout voltage is lower than the second reference voltage, wherein the first reference voltage and the second reference voltage have one of the following relationships:
   (1) the first reference voltage is equal to the second reference voltage, and both the first reference voltage and the second reference voltage are not zero;
   (2) the first reference voltage is equal to zero, and the second reference voltage is not zero;
   (3) the second reference voltage is equal to zero, and the first reference voltage is not zero; or
   (4) the first reference voltage is not equal to the second reference voltage, and both the first reference voltage and the second reference voltage are not zero.

14. The method of claim 13, wherein the bypass control signal controls the corresponding output high side switch and the input high side switch to be both turned on when the corresponding conversion voltage difference is lower than the reference voltage, so as to electrically connect the input voltage with the corresponding low dropout node via the inductor.

15. The method of claim 13, wherein a corresponding bypass switch of at least one bypass switch is controlled to be turned on when the corresponding conversion voltage difference is lower than the reference voltage, so as to electrically connect the input voltage with the corresponding low dropout node directly, wherein the at least one bypass switch is directly electrically connected between the input voltage and the corresponding low dropout node.

16. The method of claim 13, wherein the conversion voltage difference is an absolute value of a difference between the input voltage and the corresponding low dropout voltage.

17. The method of claim 13, wherein the step of generating the bypass control circuit includes:
   generating an upper threshold and a lower threshold according to the reference voltage; and
   comparing a subject signal with the upper threshold and the lower threshold, wherein the corresponding bypass control signal is enabled when the subject signal is between the upper threshold and the lower threshold, so as to electrically connect the input voltage with the corresponding low dropout node, wherein the subject signal, the upper threshold and the lower threshold have one of the following relationships:
   (1) the subject signal is the corresponding conversion voltage difference, the upper threshold is the first reference voltage and the lower threshold is the second reference voltage;
   (2) the subject signal is the corresponding low dropout voltage, the upper threshold is a sum of the input voltage and the first reference voltage, and the lower threshold is a difference between the input voltage and the second reference voltage; or
   (3) the subject signal is the input voltage, the upper threshold is a sum of the corresponding low dropout voltage and the second reference voltage, and the lower threshold is a difference between the corresponding low dropout voltage and the first reference voltage.

18. The method of claim 13, wherein the buck-boost switching regulator is further operable in a buck mode and in a boost mode respectively according to the input voltage and the corresponding low dropout voltage when the corresponding conversion voltage difference is not lower than the reference voltage and is not equal to zero.

19. The method of claim 18, wherein the buck-boost switching regulator is controlled to operate in the boost mode when a difference of the corresponding low dropout voltage minus the input voltage is not lower than the first reference voltage, and the buck-boost switching regulator is controlled to operate in the buck mode when a difference of the input voltage minus the corresponding low dropout voltage is not lower than the second reference voltage.

20. The method of claim 18, wherein the buck-boost switching regulator is further operable in a buck-boost mode according to the input voltage and the corresponding low dropout voltage when the corresponding conversion voltage difference is not lower than the reference voltage and is not equal to zero.

21. The method of claim 20, wherein the buck-boost switching regulator operates in a corresponding mode according to one of the following listed orders when the conversion voltage difference changes from higher to lower:
  (1) the boost mode, the buck-boost mode, the bypass mode, and the buck mode;
  (2) the boost mode, the bypass mode, the buck-boost mode, and the buck mode; or
  (3) the boost mode, the buck-boost mode, the bypass mode, the buck-boost mode, and the buck mode.

22. The method of claim 13, wherein the at least one output voltage includes at least one negative output voltage, and wherein the method further comprises:
  converting the corresponding low dropout voltage into a negative low dropout voltage; and
  converting the negative low dropout voltage into the at least one corresponding negative output voltage.

* * * * *